United States Patent [19]
Hiroshima et al.

[11] Patent Number: 5,801,781
[45] Date of Patent: Sep. 1, 1998

[54] APPARATUS FOR CONVERTING MOVING PICTURE STREAM OF MPEG1 TO TRANSPORT STREAM OF MPEG2

[75] Inventors: Shuuichi Hiroshima; Akihiro Okada; Masayuki Ozawa; Mamoru Udagawa, all of Kawasaki, Japan

[73] Assignee: Fujitsu Limited, Kawasaki, Japan

[21] Appl. No.: 666,788

[22] Filed: Jun. 19, 1996

[30] Foreign Application Priority Data

Nov. 14, 1995 [JP] Japan ................... 7-295130

[51] Int. Cl.$^6$ ................... H04N 7/01
[52] U.S. Cl. ................... 348/441; 348/426; 370/474
[58] Field of Search ................... 348/441, 443, 348/445, 432, 426, 458, 398, 397, 409, 412, 7, 13, 845.2; 370/474, 466, 401–405; H04N 7/01

[56] References Cited

U.S. PATENT DOCUMENTS

| | | | |
|---|---|---|---|
| 5,365,272 | 11/1994 | Siracusa | 348/409 |
| 5,371,547 | 12/1994 | Siracusa et al. | 348/409 |
| 5,481,542 | 1/1996 | Logston et al. | 348/7 |
| 5,521,927 | 5/1996 | Kim et al. | 348/423 |
| 5,544,161 | 8/1996 | Bigham et al. | 348/7 |
| 5,546,399 | 8/1996 | Shimoda | 370/94.1 |
| 5,598,415 | 1/1997 | Nuber et al. | 370/474 |
| 5,646,693 | 7/1997 | Cismas | 348/409 |

*Primary Examiner*—Tommy P. Chin
*Assistant Examiner*—Luanne P. Din
*Attorney, Agent, or Firm*—Staas & Halsey

[57] ABSTRACT

A demultiplexer receives an MPEG1 system stream obtained by multiplexing encoded data of video and audio and separates the stream into elementary streams (ES) of video and audio. A packetizer forms packetized elementary streams (PES) of MPEG2. Finally, a multiplexer divides the stream into transport packets each having a prefixed length of 188 bytes and, after that, converts the stream to an MPEG2 transport stream (TS).

13 Claims, 27 Drawing Sheets

FIG. 8A

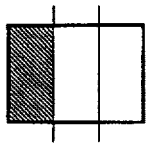

| NO | SYNTAX | BITS | DAVID | EXPLANATION/REMARKS |
|---|---|---|---|---|
| 1 | PACKET START CODE PREFIX | 24 | '0x1' (PREFIX) | START OF PES PACKET |
| 2 | STREAM ID | 8 | '0xe0':VIDEO '0xc0':AUDIO | STREAM ID |
| 3 | PES PACKET LENGTH | 16 | '0x****' (VARIABLE) | PES PACKET LENGTH |
| 4 | PES SCRAMBLE CTRL | 2 | '00':OFF (PREFIX) | SCRAMBLE ON/OFF |
| 5 | PES PRIORITY | 1 | '0':LOW (PREFIX) | PRIORITY OF THIS PES PACKET (HIGH/LOW) |
| 6 | DATA ALIGNMENT INDI | 1 | '0':NONE (PREFIX) | PRESENCE/ABSENCE OF SYNCHRONIZATION OF DATA |
| 7 | COPYRIGHT | 1 | '0':NONE (PREFIX) | PRESENCE/ABSENCE OF COPYRIGHT OF PES PACKET PAYLOAD |
| 8 | ORIGINAL OR COPY | 1 | '0':COPY (PREFIX) | PES PACKET PAYLOAD IS ORIGINAL OR COPY |
| 9 | PTS DTS FLAG | 2 | '10':PTS '11':PTS & DTS '00':NONE | PRESENCE OR ABSENCE OF PTS AND DTS |
| 10 | ESCR FLAG | 1 | '0':NONE (PREFIX) | PRESENCE OR ABSENCE OF ESCR BASE AND ESCR EXTENSION |
| 11 | ES RATE FLAG | 1 | '0':NONE (PREFIX) | PRESENCE OR ABSENCE OF ES RATE |
| 12 | DSM TRICK MODE FLAG | 1 | '0':NONE (PREFIX) | PRESENCE OR ABSENCE OF DSM TRICK MODE |
| 13 | ADDITIONAL CPY INFO FLAG | 1 | '0':NONE (PREFIX) | PRESENCE OR ABSENCE OF ADDITIONAL COPY INFORMATION |
| 14 | PES CRC FLAG | 1 | '0':NONE (PREFIX) | PRESENCE OR ABSENCE OF PES CRC |

FIG. 8B

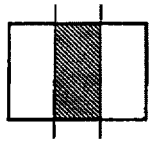

| 15 | PES EXTENTION FLAG | 1 | '0' : NONE (PREFIX) | PRESENCE OR ABSENCE OF PES EXTENSION |
|---|---|---|---|---|
| 16 | PES HEADER DATA LENGTH | 8 | '0x**' (VARIABLE) | PES HEADER DATA LENGTH |
| 17 | PTS | 33 | (VARIABLE) | PRESENTATION TIME STAMP |
| 18 | DTS | 33 | (VARIABLE) | DECODING TIME STAMP |
| 19 | ESCR BASE | 33 | ABSENT | ELEMENTARY STREAM CLOCK REFERENCE |
| 20 | ESCR EXTENTION | 9 | ABSENT | ELEMENTARY STREAM CLOCK REFERENCE EXTENSION DATA |
| 21 | ES RATE | 22 | ABSENT | ES RATE |
| 22 | TRICK MODE CONTROL | 3 | ABSENT | TRICK MODE CONTROL DATA |
| 23 | FIELD ID | 2 | ABSENT | LOCATION OF FRAME OF ONE PICTURE IS DESCRIBED |
| 24 | INTRA SLICE REFRESH | 1 | ABSENT | PRESENCE OR ABSENCE OF MISSING MICROBLOCK IN PES PACKET |
| 25 | FIELD REP CONTROL | 5 | ABSENT | EACH TIME OF I/P PICTURE IS DESCRIBED |
| 26 | ADDITIONAL COPY INFO | 7 | ABSENT | PRIVATE DATA REGARDING COPYRIGHT |
| 27 | PREVIOUS PES PACKET CRC | 16 | ABSENT | FOR NETWORK MAINTENANCE, PREVIOUS PES PACKET CRC VALUE |
| 28 | PES PRIVATE DATA FLAG | 1 | ABSENT | PRESENCE OR ABSENCE OF PES PRIVATE DATA |
| 29 | PACK HEADER FIELD FLAG | 1 | ABSENT | PRESENCE OR ABSENCE OF PACK HEADER FIELD |
| 30 | PROG. PKT SEQ. CUNTR FLG | 1 | ABSENT | PRESENCE OR ABSENCE OF PROGRAM PACKET SEQUENCE COUNTER |

FIG. 8C

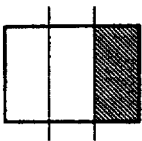

| 31 | P STD BUFF FLAG | 1 | ABSENT | | PRESENCE OR ABSENCE OF P STD BUFFER |
| 32 | PES EXTENTION FLAG 2 | 1 | ABSENT | | PRESENCE OR ABSENCE OF PES EXTENSION FIELD 2 |
| 33 | PES PRIVATE DATA | 128 | ABSENT | | PES PRIVATE DATA |
| 34 | PACK FIELD LENGTH | 8 | ABSENT | | NEXT FIELD (PACK HEADER) SIZE IS DESCRIBED |
| 35 | PROG. PKT SEQ. COUNTER | 7 | ABSENT | | PKT SEQ CTR (SIMILAR TO CONTINUITY COUNTER) |
| 36 | MPEG1 MPEG2 IDENTIFIER | 1 | ABSENT | | WHAT IS STREAM IN PES PACKET? |
| 37 | ORIGINAL STUFF LENGTH | 6 | ABSENT | | ORIGINAL STUFF LENGTH |
| 38 | P STD BUFF SCALE | 1 | ABSENT | | P STD BUFF SCALE |
| 39 | P STD BUFF SIZE | 13 | ABSENT | | P STD BUFF SIZE |
| 40 | PES EXTEN. FIELD LEN | 7 | ABSENT | | PES EXTENSION FIELD LENGTH |
| 41 | PES PACKET DATA BYTE | 8 | '0x**' | (VARIABLE) | PES PACKET DATA BYTE |

FIG. 9A

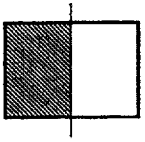

| NO | NAME | CODE IN FIG. 9 | SYNTAX |
|---|---|---|---|
| 1 | PACKET START CODE | 132 | PACKET START CODE PREFIX |
| 2 | STREAM ID | 134 | STREAM ID |
| 3 | PACKET LENGTH | 136 | PES PECKET LENGTH |
| 4 | SCRAMBLE CONTROL | 144 | PES SCRAMBLE CONTROL |
| 5 | PES PRIORITY | 146 | PES PRIORITY |
| 6 | DATA ALIGNMENT INDICATOR | 148 | DATA ALIGNMENT INDICATOR |
| 7 | COPYRIGHT | 150 | COPYRIGHT |
| 8 | ORIGINAL/COPY | 152 | ORIGINAL/COPY |
| 9 | SEVEN FLAGS | 154 | PTS DTS FLAG |
| 10 | SEVEN FLAGS | 154 | ESCR FLAG |
| 11 | SEVEN FLAGS | 154 | ES RATE FLAG |
| 12 | SEVEN FLAGS | 154 | DSM TRICK MODE FLAG |
| 13 | SEVEN FLAGS | 154 | ADDITIONAL COPY INFORMATION FLAG |
| 14 | SEVEN FLAGS | 154 | PES CRC FLAG |
| 15 | SEVEN FLAGS | 154 | PES EXTENSION FLAG |
| 16 | PES HEADER DATA LENGTH | 156 | PES HEADER DATA LENGTH |
| 17 | PRESENTATION TIME STAMP | 162 | PTS |
| 18 | DECODING TIME STAMP | 164 | DTS |
| 19 | ES CLOCK REFERENCE | 166 | ESCR BASE |
| 20 | ES CLOCK REFERENCE EXTENSION | 166 | ESCR EXTENSION |

FIG. 9B

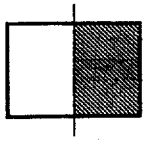

| | | | | |
|---|---|---|---|---|
| 21 | ES RATE | 168 | ES RATE |
| 22 | TRICK MODE CONTROL | 170 | TRICK MODE CONTROL |
| 23 | FIELD ID | NONE | FIELD ID |
| 24 | INTRA SLICE REFRESH | NONE | INTRA SLICE REFRESH |
| 25 | FIELD REPETITION CONTROL | NONE | FIELD REPETITION CONTROL |
| 26 | ADDITIONAL COPY INFORMATION | 172 | ADDITIONAL COPY INFORMATION |
| 27 | PREVIOUS PES PACKET CRC | 174 | PREVIOUS PES PACKET CRC |
| 28 | FIVE FLAGS | 178 | PES PRIVATE FLAG |
| 29 | FIVE FLAGS | 178 | PACK HEADER FIELD FLAG |
| 30 | FIVE FLAGS | 178 | PROGRAM PACKET SEQUENCE CONTROL FLAG |
| 31 | FIVE FLAGS | 178 | P STD BUFF FLAG |
| 32 | FIVE FLAGS | 178 | PES EXTENTION FLAG 2 |
| 33 | PES PRIVATE DATA | 182 | PES PRIVATE DATA |
| 34 | PACK FIELD LENGTH | 184 | PACK FIELD LENGTH |
| 35 | PROGRAM PACKET SEQUENCE COUNTER | 186 | PROGRAM PACKET SEQUENCE COUNTER |
| 36 | STREAM ID | | MPEG1 MPEG2 IDENTIFIER |
| 37 | ORIGINAL STUFF LENGTH | | ORIGINAL STUFF LENGTH |
| 38 | P-STD BUFFER | 188 | P-STD BUFFER SCALE |
| 39 | P-STD BUFFER | 188 | P-STD BUFFER SIZE |
| 40 | PES EXTENSION FIELD LENGTH | 190 | PES EXTENTION FIELD LENGTH |
| 41 | PES EXTENSION FIELD | 192 | |
| | PACKET DATA BYTE | 192 | PES PACKET DATA BYTE |

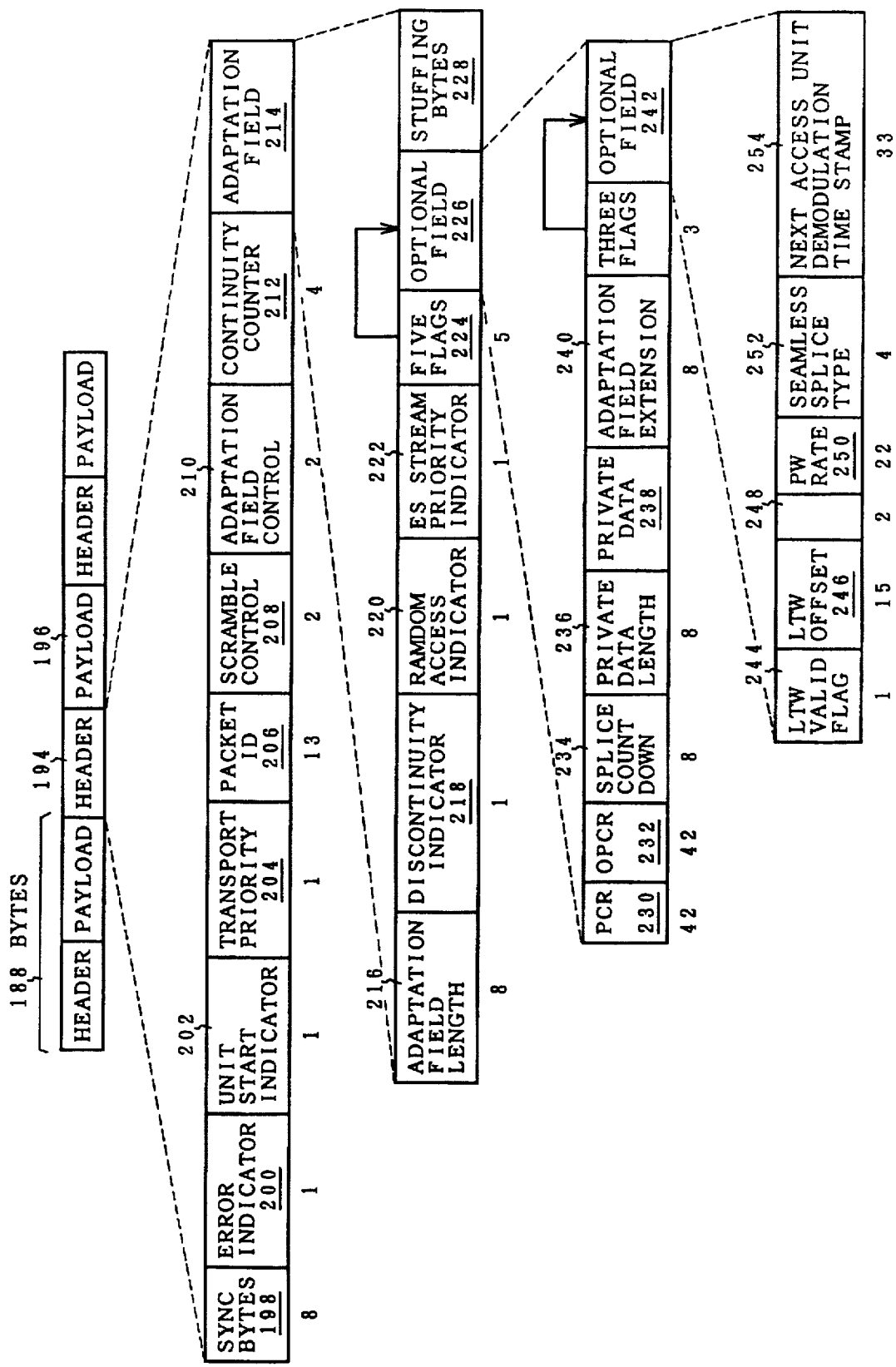

FIG.12

| NO | SYNTAX | BITS | DAVID | EXPLANATION/REMARKS |
|---|---|---|---|---|
| 1 | SYSC BYTE | 8 | '0x47' (PREFIX) | SYNC BYTES |
| 2 | TRANSPORT ERROR IND. | 1 | '0' :NONE (PREFIX) | PRESENCE OR ABSENCE OF BIT ERROR IN PACKET |
| 3 | PAYLOAD UNIT START IND. | 1 | '1'/'0' | WHETHER NEW PES PACKET APPEARS IN THIS TS PAYLOAD OR NOT? |
| 4 | TRANSPORT PRIORITY | 1 | '0' :LOW (PREFIX) | PRIORITY OF THIS TS PACKET IN THE SAME PID |
| 5 | PID | 13 | '0x21' :VIDEO<br>'0x20' :AUDIO<br>(SPECIFIED TO TS PARA FIRST) | '0x00' :PAT<br>'0x01' :CAT<br>'0x02'~'0x0f' :RESERVATION<br>'0x1fff' :NULL PACKET |
| 6 | TRANSPORT SCRBL CTRL | 2 | '00' :OFF (PREFIX) | SCRAMBLE ON/OFF |
| 7 | ADAPTATION FIELD CTRL | 2 | '11'<br>'01' | PRESENCE OR ABSENCE OF ADAPTATION FIELD/PAYLOAD<br>'10' :ADAPTATION FIELD EXISTS<br>'11' :PAYLOAD EXISTS<br>'00' :IGNORED<br>(NULL PACKET: '01') |
| 8 | CONTINUITY COUNTER | 4 | '0000' (PREFIX) | INCREMENT (CONTINUITY COUNTER) |

FIG. 13A

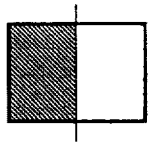

| NO | SYNTAX | BITS | DAVID | EXPLANATION/REMARKS |
|---|---|---|---|---|
| 1 | ADAPTATION FIELD LENGTH | 8 | '0x**' (VARIABLE) | ADAPTATION FIELD LENGTH |
| 2 | DISCONTINUITY INDICATOR | 1 | '0' : NONE (PREFIX) | CHANGE IN PCR VALUE IN CONTINUOUS TS PACKETS |
| 3 | RANDAM ACCESS INDICATOR | 1 | '0' : NONE (PREFIX) | PRESENCE/ABSENCE OF LOCATION SPECIFICATION OF ACCESS POINT OF ES |
| 4 | ES PRIORITY INDICATOR | 1 | '0' : LOW (PREFIX) | HIGH/LOW OF PRIORITY OF TS PACKET |
| 5 | PCR FLAG | 1 | '0' : NONE (PREFIX) | PRESENCE/ABSENCE OF PRESENTATION CLOCK REFERENCE FIELD |
| 6 | OPCR FLAG | 1 | '0' : NONE (PREFIX) | PRESENCE/ABSENCE OF ORIGINAL PCR FIELD |
| 7 | SPLICING POINT FLAG | 1 | '0' : NONE (PREFIX) | PRESENCE OR ABSENCE OF SPLICE POINT → SPLICE COUNTDOWN FIELD |
| 8 | TRANSPORT PRVTE DATA FLG | 1 | '0' : NONE (PREFIX) | PRESENCE/ABSENCE OF PRIVATE DATA FIELD |
| 9 | ADAP. FIELD EXT. FLAG | 1 | '0' : NONE (PREFIX) | PRESENCE/ABSENCE OF ADAPTATION FIELD EXTENSION FIELD |
| 10 | PCR BASE | 33 | ABSENT | PRESENTATION CLOCK REFERENCE BASE 90KHz |
| 11 | PCR EXTENSION | 9 | ABSENT | PRESENTATION CLOCK REFERENCE BASE 27KHz |
| 12 | OPCR BASE | 33 | ABSENT | COUNTDOWN UNTIL SPLICING POINT |
| 13 | OPCR EXTENSION | 9 | ABSENT | ORIGINAL PCR BASE 90KHz |
| 14 | SPLICE COUNTDOWN | 8 | ABSENT | ORIGINAL PCR BASE 27KHz |

FIG.13B

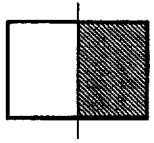

| 15 | TRANSPORT PRVTE DATA LEN | 8 | ABSENT | PRIVATE DATA LENGTH |
|---|---|---|---|---|
| 16 | PRIVATE DATA BYTE | 8 | ABSENT | PRIVATE DATA |
| 17 | ADAP. FIELD EXT. LENGTH | 8 | ABSENT | ADAPTATION FIELD EXTENSION FIELD LENGTH |
| 18 | LTW FLAG | 1 | ABSENT | PRESENCE/ABSENCE OF (LEGAL TIME WINDOWS) LTW FIELD |
| 19 | PIECEWISE RATE FLAG | 1 | ABSENT | PRESENCE/ABSENCE OF PIECEWISE RATE FIELD |
| 20 | SEAMLESS SPLICE FLAG | 1 | ABSENT | PRESENCE/ABSENCE OF SEAMLESS SPLICE FIELD |
| 21 | LTW VALID FLAG | 1 | ABSENT | LTW OFFSET FIELD IS INVALID/VALID |
| 22 | LTW OFFSET | 15 | ABSENT | FLUCTUATION OF ARRIVAL TIME OF FIRST BYTE OF TS |
| 23 | PIECEWISE RATE | 22 | ABSENT | RATE (OTHER THAN 0) OF EVERY PID |
| 24 | SPLICE TYPE | 4 | ABSENT | TYPE OF SPLICE |
| 25 | DTS NEXT AU | 33 | ABSENT | DTS OF NEXT ACCESS UNIT |

FIG. 14A

| NO | NAME | CODE IN FIG. 12 | SYNTAX |
|----|------|-----------------|--------|
| 1 | SYNC BYTES | 198 | SYNCHRONOUS BYTE |
| 2 | ERROR INDICATOR | 200 | TRANSPORT ERROR INDICATOR |
| 3 | UNIT START INDICATOR | 202 | PAYLOAD UNIT START INDICATOR |
| 4 | TRANSPORT PRIORITY | 204 | TRANSPORT PRIORITY |
| 5 | PACKET ID | 206 | PID |
| 6 | SCRAMBLE CONTROL | 208 | TRANSPORT SCRAMBLE CONTROL |
| 7 | ADAPTATION FIELD CONTROL | 210 | ADAPTATION FIELD CONTROL |
| 8 | CONTINUITY COUNTER | 212 | CONTINUITY COUNTER |

FIG. 14B

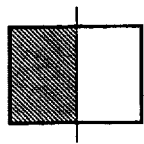

| NO | NAME | CODE IN FIG. 12 | SYNTAX |
|---|---|---|---|
| 1 | ADAPTATION FIELD LENGTH | 216 | PACKET START CODE PREFIX |
| 2 | DISCONTINUITY INDICATOR | 218 | DISCONTINUITY INDICATOR |
| 3 | RANDOM ACCESS INDICATOR | 220 | RANDOM ACCESS INDICATOR |
| 4 | ES PRIORITY INDICATOR | 222 | ES PRIORITY INDICATOR |
| 5 | FIVE FLAGS | 224 | PCR FLAG |
| 6 | FIVE FLAGS | 224 | OPCR FLAG |
| 7 | FIVE FLAGS | 224 | SPLICING POINT FLAG |
| 8 | FIVE FLAGS | 224 | TRANSPORT PRIVATE DATA FLAG |
| 9 | FIVE FLAGS | 224 | ADAPTATION FIELD EXTENSION FLAG |
| 10 | PCR | 230 | PCR BASE |
| 11 | PCR | 230 | PCR EXTENSION |
| 12 | OPCR | 232 | OPCR BASE |
| 13 | OPCR | 232 | OPCR EXTENSION |
| 14 | SPLICE COUNTDOWN | 234 | SPLICE COUNTDOWN |
| 15 | PRIVATE DATA LENGTH | 236 | TRANSPORT PRIVATE DATA LENGTH |

FIG.14C

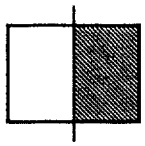

| 16 | PRIVATE DATA | | PRIVATE DATA BYTE |
|---|---|---|---|
| 17 | ADAPTATION FIELD EXTENSION LENGTH | 238 | ADAPTATION FIELD EXTENSION LENGTH |
| 18 | LTW VALID FLAG | 240 | LTW VALID FLAG |
| NONE | LTW OFFSET | 244 | LTW OFFSET |
| 19 | PW RATE FLAG | 246 | PIECEWISERATE FLAG |
| 20 | SEAMLESS SPLICE FLAG | NONE | SEAMLESS SPLICE FLAG |
| 21 | ITW VALID FLAG | NONE | LTW VALID FLAG |
| 22 | ITW OFFSET | NONE | LTW OFFSET |
| 23 | PW RATE | 250 | PIECEWISE RATE |
| 24 | SPLICE TYPE | 252 | SPLICE TYPE |
| 25 | NEXT ACCESS UNIT DEMODULATION TIME STAMP | 254 | DST NEXT ACCESS |

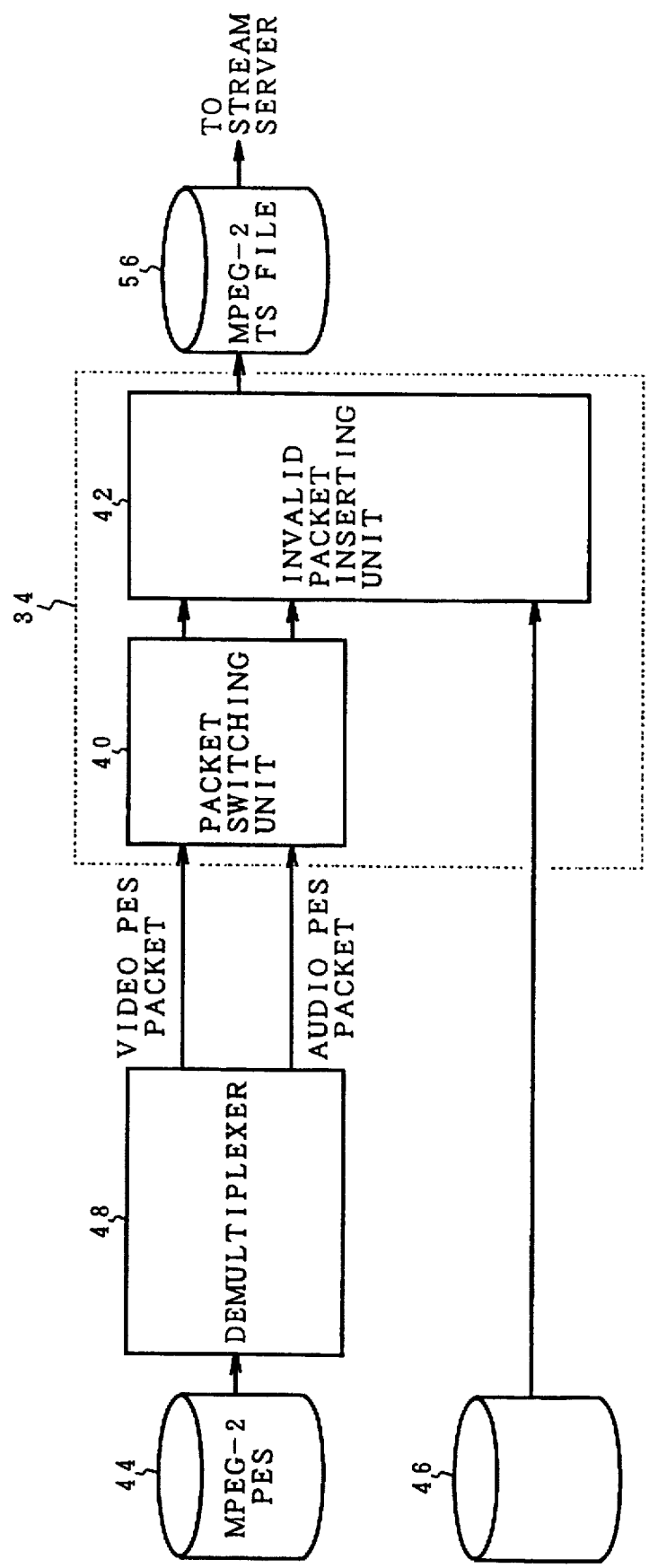

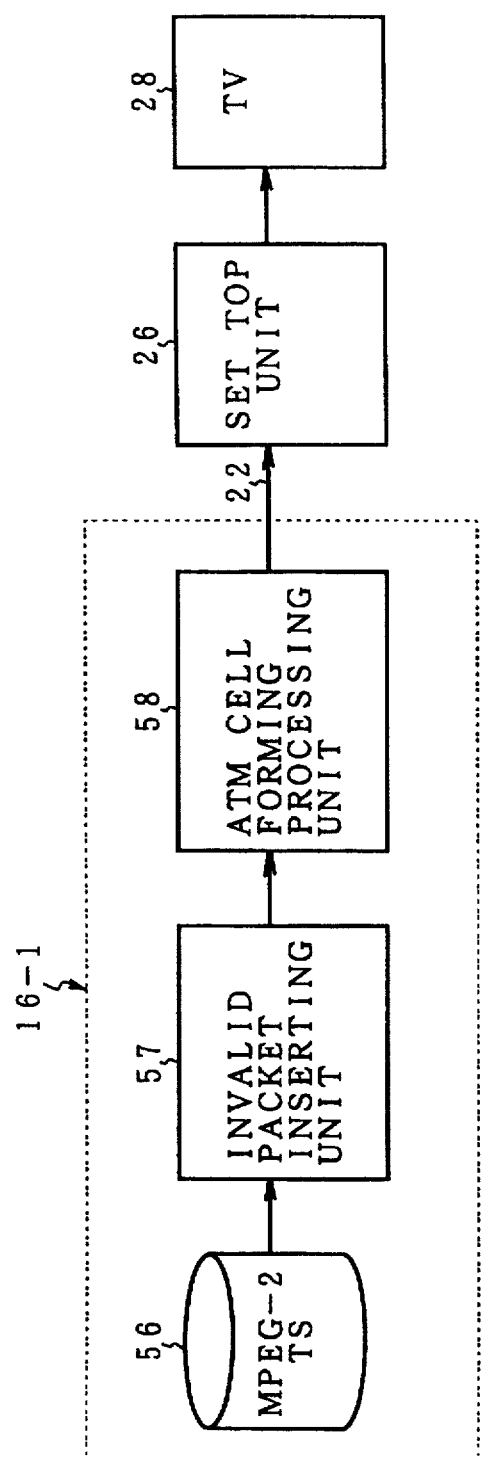

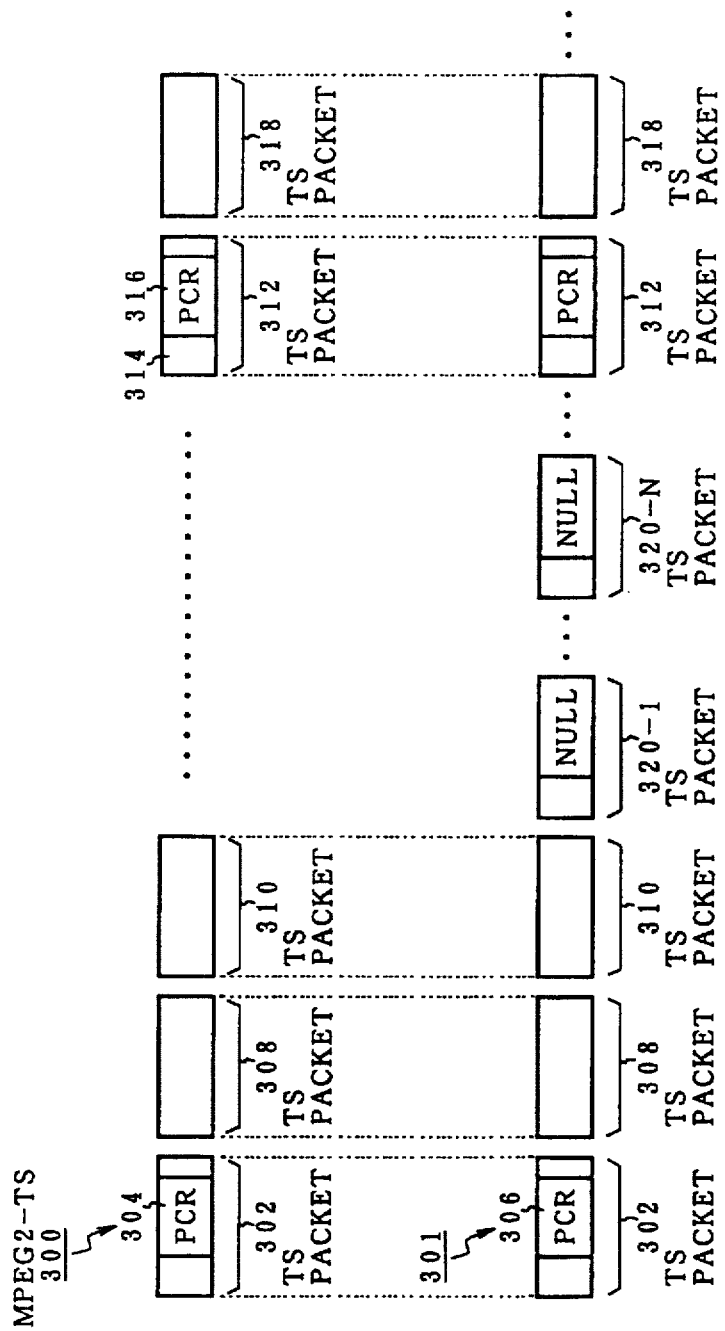
F I G. 21

APPARATUS FOR CONVERTING MOVING PICTURE STREAM OF MPEG1 TO TRANSPORT STREAM OF MPEG2

BACKGROUND OF THE INVENTION

The present invention relates to a moving picture stream converting apparatus for converting a moving picture stream according to phase 1 of an international standard of a moving picture compression of a media integration system (MPEG: Moving Picture Experts Group), that is, MPEG1 into a moving picture stream according to phase 2 of the MPEG, that is, MPEG2. More particularly, the invention relates to a moving picture stream converting apparatus for converting a system stream of MPEG1 to a transport stream of MPEG2.

Hitherto, in a video-on-demand system for providing video data and audio data via a network in accordance with a request of the user, it is necessary to provide substantially the same operation, response, and function provided when the video and audio data is reproduced by using a VTR, without making the user aware of a network and a center. A video server installed in the center transmits a stream of moving picture data of a program requested via a user terminal, known as a set top unit. A moving picture stream including the video and audio data of the program which is transmitted by the video server of the center is usually converted into digital information and is stored in a compressed format. As such a conversion of the moving picture stream, a moving picture stream according to MPEG1 and a moving picture stream according to MPEG2 are known. According to MPEG1, piecewise code streams of the video and audio data and the like of an arbitrary number of channels are multiplexed, thereby constructing a single stream as one program. Such a stream is called an MPEG1 system stream. Titles of the ISO/IEC Standards regarding MPEG1 are ISO/IEC 11172-2 Image Effective in 1992 and ISO/IEC 11172-3 Voice Effective in 1992. The system stream of MPEG1 is transferred at a fixed bit rate of 1.536 Mbps. By recording the MPEG1 system stream into a CD-ROM, it is reproduced and used. MPEG2 makes it possible to correspond to applications including MPEG1 in a wide range. In the video-on-demand system, a transport stream (hereinafter, referred to as "TS") in which a plurality of programs can be constructed is used. It is generally called an MPEG2-TS. Consequently, the MPEG2-TS can also cope with a television broadcasting and has a degree of freedom in a program organization and a scramble function, so that it is presumed that MPEG2-TS will be a main stream in the video-on-demand system in future. Titles of the ISO/IEC Standards regarding MPEG2 are ISO/IEC 13818-2 Image Effective in 1994 and ISO/IEC 13818-3 Voice Effective in 1994.

Since the price of an encoder for forming data in the MPEG2 format is, however, about twenty times as high as the price for an encoder for forming data in the MPEG1 format, it is difficult to buy and use the encoder of the MPEG2 format. Consequently, as a video-on-demand system, only a system which uses the encoder of MPEG1 and whose functions are limited can be constructed. A medium such as a CD-ROM or the like records data in the MPEG1 format. In the video-on-demand system corresponding to MPEG2, video and audio data reproduced from the CD-ROM or the like of the MPEG1 format is again converted to the MPEG2-TS data and the MPEG2-TS data is transmitted. In this case, after the MPEG1 stream was decoded, it is converted to the MPEG2-TS, so that an expensive MPEG encoder is similarly necessary. After the video and audio data which have been compressed and encoded as an MPEG1 stream are decoded, the same compression encoding is again executed. Thus, the conversion process requires the inherently unnecessary step of having to decode the data after the encoding process. As a result conversion distortion is increased.

SUMMARY OF THE INVENTION

According to the invention, a moving picture stream converting apparatus in which data which was converted to data of MPEG1 is easily converted into a transport stream of MPEG2 and a system corresponding to MPEG2 can be constructed without needing an expensive MPEG2 encoder is provided.

A moving picture stream converting apparatus of the invention is constructed by a demultiplexer, a packetizer, and a multiplexer. The demultiplexer receives an MPEG1 system stream including a stream of encoded video data and a stream of encoded audio data and separates an elementary stream (hereinlater, referred to as "ES") of each of the video and audio data. A packetized elementary stream (hereinlater, referred to as "PES") of MPEG2 is formed by the packetizer from each of the video and audio elementary streams separated by the demultiplexer. The multiplexer divides the video and audio packetized elementary streams into transport packets each having a fixed length (188 bytes) and, thereafter, multiplexes the transport packets, thereby converting to a transport stream (hereinafter, referred to as "TS") of MPEG2. The MPEG1 system stream as a conversion source is constructed by a plurality of packs, in which one pack obtained by combining a plurality of packets is set to one unit. A head pack is constructed by a pack header, a system header, and a plurality of packets. Each of second and subsequent packs is constructed by a pack header and a plurality of packets. The packet is constructed by an ES header and an ES payload. A packet start code, a stream ID indicative of the kind of video/audio and a channel number, a packet length of ES payload, time management information of a reproduction output, and time management information of a decoding have been stored as parameters in the elementary stream header. Video or audio encoded data has been stored in the ES payload. Each packet of the PES of MPEG2 is constructed by a PES header and a PES payload. A packet start code, a stream ID indicative of the kind of video/audio and a channel number, a packet length of PES payload, time management information of a reproduction output, and time management information of a decoding have been stored in the PES header. Video or audio encoded data has been stored in the PES payload.

The packetizer receives on a packet unit basis the MPEG1 system streams which were separated into the video and audio data, analyzes the ES header, extracts the stream ID, packet length, time management information of the reproduction output, and time management information of the decoding, and stores them to relevant locations of a sample PES header of MPEG2 which has been prepared, thereby forming a PES header. Further, the packetizer cuts out data of a predetermined length from the ES payload and stores into the ES payload, thereby forming a PES packet. The MPEG2-TS is constructed by a TS header of a predetermined byte length (188 bytes) and a TS payload. As parameters, the TS header has: sync bytes; an error indicator showing the presence or absence of a bit error in a packet; a unit start indicator showing the presence or absence of a start of a new PES packet in the TS payload; a stream ID indicative of the kind of video/audio and a channel number;

control information indicative of the presence or absence of an adaptation field and the payload; and the adaptation field. The multiplexer cuts out each of the video and audio PES packets formed by the packetizer on a predetermined byte length unit basis and stores into the TS payload. The multiplexer forms the TS header corresponding to the stored data and adds it to the location before each of the TS payloads, thereby converting to the MPEG2-TS.

A multiplexer has an invalid packet inserting unit for inserting a TS invalid packet in which invalid data has been stored in the TS payload so as to be adapted to a transmission rate of MPEG2-TS when the PES formed by the packetizer is converted to the MPEG2-TS. The invalid packet inserting module inserts the TS packet in which the invalid data has been stored in the payload so as to obtain a transmission rate of 6.144 Mbps of MPEG2 for a transmission rate of 1.536 Mbps of MPEG1. In the invalid packet inserting module arranges the TS packet in which program specification information that is used at the time of a decoding and a system clock reference value (program clock reference) serving as a clock reference of a decoder have been stored is arranged to the head of the TS and, after that, video and audio TS packets are multiplexingly arranged. As program specification information which is added, a TS packet in which a program association table has been stored in the payload and a TS packet in which a program map table has been stored in the payload are arranged. Consequently, the converting apparatus of the invention can easily form a file of MPEG2-TS in which although the contents are based on MPEG1, they are apparently adapted to the transmission rate of 6.144 Mbps. Further, with respect to the TS packet in which the payload is inserted as invalid data, the invalid packet inserting module stores information indicating that although such a TS packet is an invalid packet in the MPEG2 standard, meaningful data has been stored at the head position of the payload and stores user data into the remaining portion of the payload. The payload in the invalid packet can be consequently used for the insertion of the user data without deteriorating the setting as an invalid packet on MPEG2. Specifically speaking, with respect to the header of the TS packet, data indicating that the payload is not the head payload is set to the unit start indicator, an invalid packet ID (0x1FFF) is set to the packet ID, "there is a payload" is set to the adaptation field control, and further, a predetermined user flag is set to the head byte of the payload. By the setting of such parameters, in the decoder, after confirming the unit start indicator of the TS header, packet ID, and adaptation field control, when the user flag in the head byte of the payload is recognized, the user data subsequently stored can be processed.

As for the insertion of the invalid packet, there is provided an invalid packet inserting module such that when the MPEG2-TS formed by the multiplexer is transferred to a terminal through, for example, an ATM network, the TS packet in which the invalid data has been stored in the TS payload so as to be adapted to the transmission rate of MPEG2. In this case, since no invalid packet is inserted into the MPEG2-TS converted according to the invention, a file capacity in case of storing the data into a hard disk or the like can be reduced by an amount corresponding to the invalid packet. The invalid packet inserting module in this case inserts the TS packet in which invalid data has been stored in the payload so that the transmission rate is set to the transmission rate of 6.144 Mbps of MPEG2 for the transmission rate of 1.536 Mbps of MPEG1. The invalid packet inserting module also arranges the TS packet in which the system clock reference as a clock reference of the decoder has been stored in the payload to the head of the TS. Subsequent to such an invalid packet inserting module, an ATM cell forming processing unit for converting the MPEG2-TS to a cell of an ATM network and transmitting is provided.

The demultiplexer, packetizer, and multiplexer constructing the apparatus of the invention form an editing system (authoring system) of video service and provides the MPEG2-TS converted from the stream of the MPEG1 system to the video server installed in the video-on-demand center through a medium or a communication line.

The above and other objects, features, and advantages of the present invention will become more apparent from the following detailed description with reference to the drawings.

BRIEF DESCRIPTION OF THE DRAWINGS

FIGS. 8A, 8B, and 8C are explanatory diagrams showing the details of a header parameter of the PES packet of FIG. 7;

FIGS. 9A and 9B are explanatory diagrams of a parameter correspondence of the PES packets of FIGS. 7 and 8A, 8B, and 8C;

FIG. 11 is an explanatory diagram of an MPEG2-TS which is converted in FIG. 4;

FIG. 12 is an explanatory diagram showing the details of header parameters in FIG. 11;

FIGS. 13A and 13B are explanatory diagrams showing the details of parameters of an optional field head in FIG. 4;

FIGS. 14A, 14B, and 14C are explanatory diagrams showing the correspondence of the parameters in FIGS. 11, 12, and 13;

FIG. 18 is a block diagram of an embodiment of mode 3 in which user data can be inserted into an invalid packet;

FIG. 20 is a functional block diagram when the invalid packet is inserted just before a transmission of MPEG2 formed in mode 1 to a network; and FIG. 21 is an explanatory diagram of an invalid packet inserting process of FIG. 20.

DETAILED DESCRIPTION OF THE PREFERRED EMBODIMENTS

Figure 1:
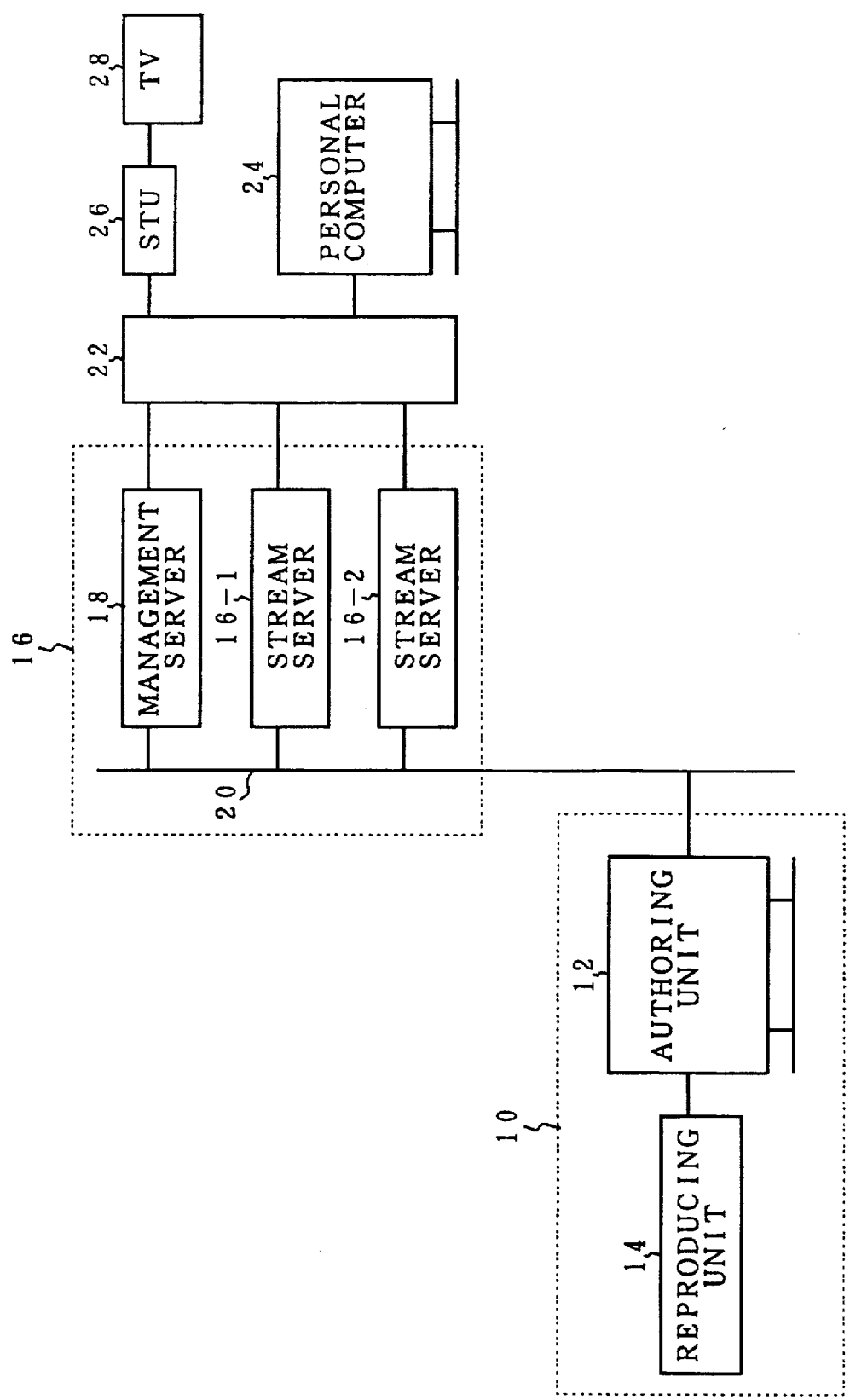
FIG. 1 is a block diagram of a video-on-demand system as an operation environment of the invention.

FIG. 1 is a block diagram of an operation environment to which a moving picture stream converting apparatus of the invention is applied. An authoring system (editing system) 10 is constructed by an authoring unit 12 for realizing a function of a moving picture stream converting apparatus and a reproducing unit 14 using a VTR, a CD-ROM drive, or the like. As an authoring unit 12, for example, a personal computer for executing an application program which provides a moving picture stream converting function of the invention can be used and has therein an MPEG1 encoder as an input unit.

In the authoring unit 12, an assimilation stream of a video tape or a CD-ROM reproduced by the reproducing unit 14 is converted to an MPEG1 system stream by the MPEG1 encoder and is stored as file data into a hard disk or the like of the authoring unit 12. The authoring unit 12 converts the MPEG1 system stream, as a target, converted from the reproducing unit 14 to an MPEG2-TS (transport stream). The MPEG2-TS converted by the authoring unit 12 is transferred to stream servers 16-1 and 16-2 installed in a center 16 in the video-on-demand system by a network 20 such as an LAN or the like and is stored as file data into a hard disk of each of the servers. It is also possible for the MPEG2-TG converted by the authoring unit 12 to be stored into a memory medium such as an optical disk.

The memory medium is set in a drive of each of the stream servers 16-1 and 16-2 in the center 16 and is reproduced. A management server 18 is connected to the stream servers 16-1 and 16-2 through the network 20. The stream servers 16-1 and 16-2 and management server 18 are connected to a television apparatus 28 as a user terminal through an external network 22 and a set top unit 26 and are also connected to a personal computer 24 of the user through the network 22. The video-on-demand system corresponds to MPEG2 having a transmission rate of 6.144 Mbps and transmits data by a prefix bit rate of the MPEG2-TS through the network 22. An ATM network is generally used as a network 22. The ATM network operates in an asynchronous transfer mode (ATM) in which a transmission rate is equal to 156 Mbps.

In the video-on-demand system, for example, when the user of the television apparatus 28 requests an arbitrary program to the center 16 through the set top unit 26, the request is received by the management server 18. Stream server 16-1 or 16-2, both of which are in a vacant state, is instructed to transmit the MPEG2-TS of the requested program. The transfer of the MPEG2-TS is received through the network 22 and set top unit 26. Video and audio signals are demodulated by an MPEG2 decoder and reproduced by the television apparatus 28.

Figure 2:
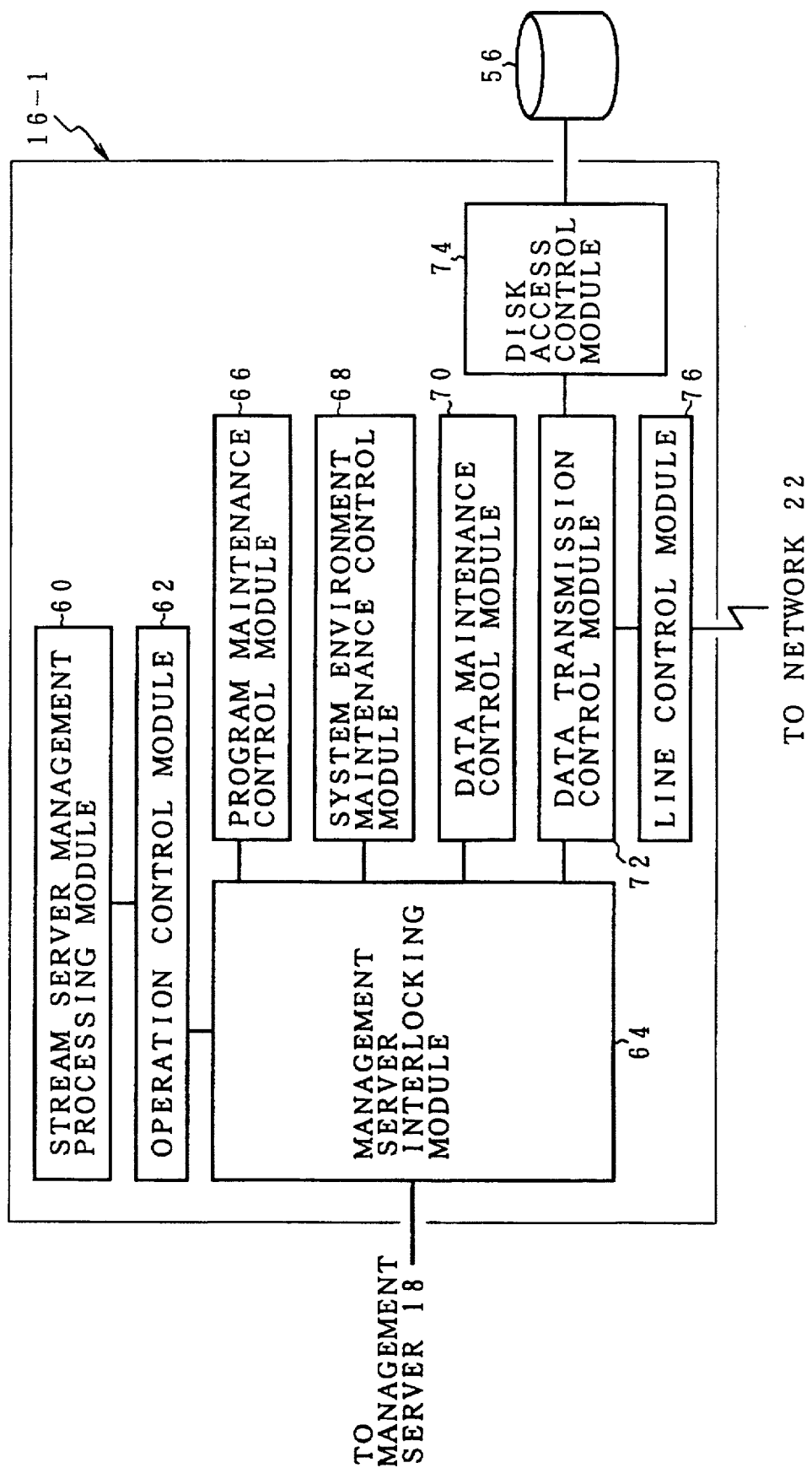
FIG. 2 is a functional block diagram of a stream server in FIG. 1.

FIG. 2 shows a construction of a program module of the stream server 16-1 provided in the center 16 in FIG. 1. The stream server 16-1 has a stream server management processing module 60, an operation control module 62, a management server interlocking module 64, a program maintenance control module 66, a system environment maintenance module 68, a data maintenance control module 70, a data transmission control module 72, a disk access control module 74, and a line control module 76. The disk access control module 74 has a hard disk 56. The MPEG2-TS converted from the MPEG1 system stream by the authoring unit 12 in the authoring system 10 in FIG. 1 has been stored in the hard disk 56. When a program transmission is instructed from the management server 18 to the stream server 16 through the management server interlocking module 64, the stream server management processing module 60 is activated and a state of the stream having the program whose transmission was instructed is grasped. When the stream is not transmitted yet, the operation control module 62 is activated, the data transmission control module 72 is controlled, and the relevant MPEG2-TS is read out from the hard disk 56 by the disk access control module 74 and is transmitted to the network 22 from the line control module 76.

Figure 3:
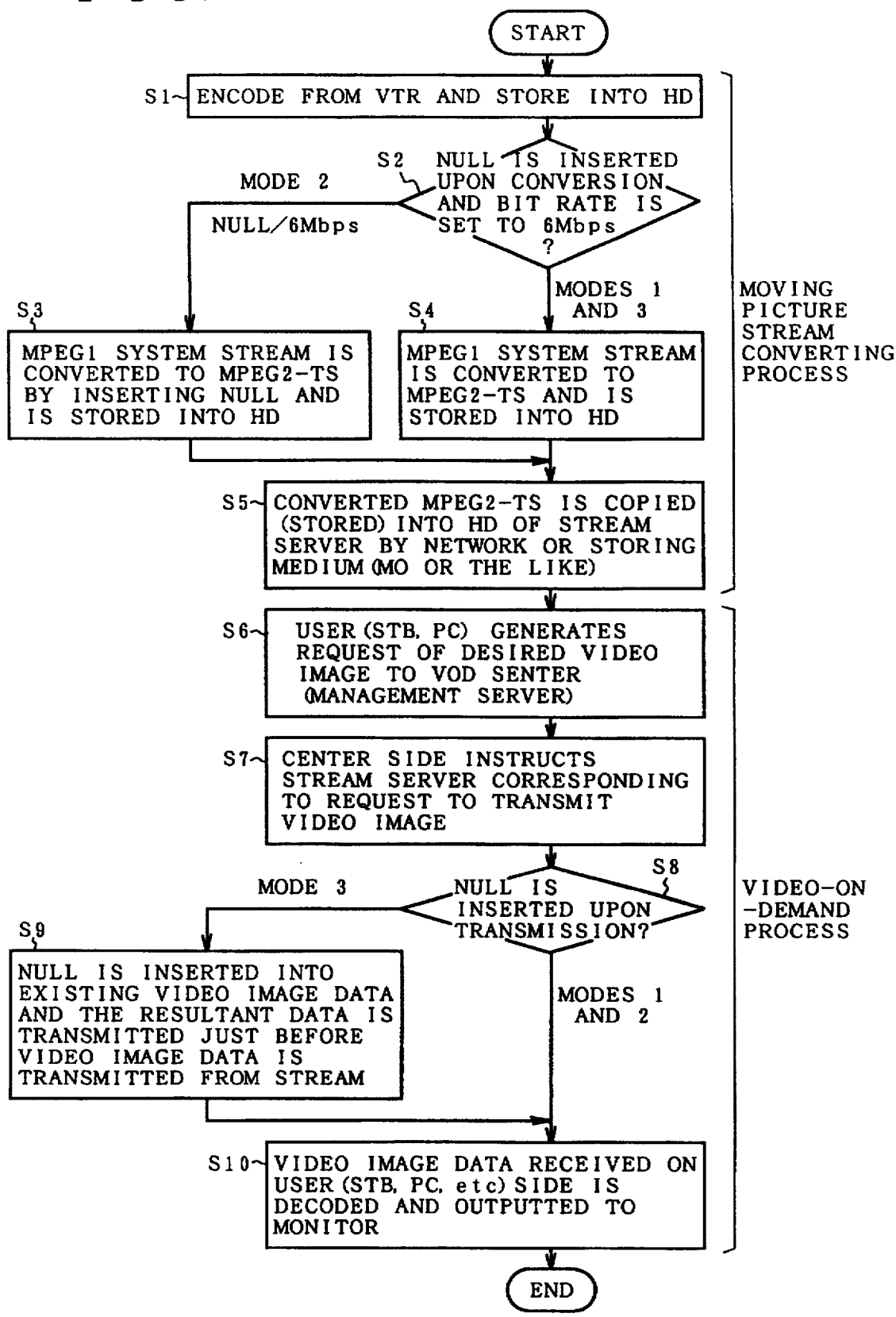
FIG. 3 is a flowchart for a moving picture stream converting process and a video-on-demand process of the invention in FIG. 1.

FIG. 3 is a flowchart for a conversion of a moving picture stream by the authoring system 10 in FIG. 1 and a video-on-demand process by the stream servers 16-1 and 16-2 installed in the center 16. Processes in steps S1 to S5 relate to a moving picture stream converting process which is executed by the authoring unit 12 in the authoring system 10. Processes in steps S6 to S10 relate to a video-on-demand process for transmitting the moving picture stream to the user. The video-on-demand process is performed by, for example, the stream server 16-1 in the center 16. In the moving picture stream converting process of the invention, the MPEG1 system stream as a conversion source is converted to the MPEG2-TS. The converting process is divided into the following three modes.

Mode 1

It relates to a conversion from the MPEG1 system stream to the MPEG2-TS. A transmission rate is not changed but only a syntax is converted.

Mode 2

It relates to a conversion from the MPEG1 system stream to the MPEG2-TS. An invalid packet (NULL packet) is inserted, thereby changing a transmission rate to 6.144 Mbps corresponding to MPEG2.

Mode 3

As for the conversion from the MPEG1 system stream to the MPEG2-TS, a transmission rate is not changed but only a syntax is converted in a manner similar to Mode 1. The invalid packet (NULL packet) is inserted just before the MPEG2-TS is transmitted to the network, thereby changing the transmission rate to 6.144 Mbps corresponding to MPEG2.

The flowchart of FIG. 3 shows the moving picture stream converting process and the video-on-demand process with respect to such modes 1, 2, and 3. First, the moving picture stream converting process in steps S1 to S5 will be described. The authoring unit 12 in the authoring system 10 in FIG. 1 reproduces an arbitrary program from the reproducing unit 14 such as a VTR or the like and stores it as an MPEG1 system stream into a hard disk in step S1. When the reproduction signals from the VTR are raw video and audio data, the signals are converted to the MPEG1 system stream by using the MPEG1 encoder provided in the authoring unit 12 and, after that, the MPEG1 system stream is stored into the hard disk. It will be obviously understood that when the data has been stored in the format of the MPEG1 system stream in the medium, the final data is stored as it is into the hard disk.

A check is made to see whether the invalid packet NULL is inserted upon conversion and the bit rate is set to 6.144 Mbps of MPEG2 or not in step S2. This is a judgement of the mode 1, 2, or 3. When the invalid packet NULL is not inserted upon conversion and the bit rate is not changed, Mode 1 is judged. The processing routine advances to step S3, the MPEG1 system stream stored in the hard disk is converted to the MPEG2-TS and is stored into the hard disk. When the invalid packet NULL is inserted upon conversion and the bit rate is changed to 6.144 Mbps in step S2, Mode 2 is set and step S4 follows. In step S4, the invalid packet NULL is inserted when the MPEG1 system stream is converted to the MPEG2-TS and the bit rate is changed to 6.144 Mbps corresponding to MPEG2 and the resultant data is stored into the hard disk. Further, a case where the invalid packet NULL is inserted when the MPEG2-TS is transmitted to the network in mode 3 is the same as that in mode 1 and the same process as that in step S3 is executed. The MPEG2-TS converted in accordance with mode 1, 2, or 3 as mentioned above is stored in the network 20 or a memory medium such as an optical disk MO or the like and, in this state, it is copied into the hard disk of the stream server 16-1 or 16-2 installed in the center 16 of the video-on-demand system as shown in FIG. 1.

The video-on-demand process in steps S6 to S10 will now be described. It is assumed that a desired program was requested from the set top unit 26, the personal computer 24, or the like of the user to the management server 18 in the center 16 in step S6. The center 16 side instructs the stream server corresponding to the request from the user. For example, the stream server 16-1 is instructed to transmit the video image in step S7. Upon the receipt of the instruction, the stream server 16-1 checks whether the invalid packet NULL is inserted when the stream is transmitted in step S8. That is, a check is made to see if it is a transmission in mode 3. If YES, step S9 follows and, for example, as shown in FIG. 2, the stream server 16 reads out the MPEG2-TS of the video image corresponding to the request from the hard disk 56 and transmits it to the user through the network 22. The invalid packet is inserted just before the transmission and the bit rate is changed to 6.144 Mbps corresponding to MPEG2, and after that, the data is transmitted. On the contrary, with respect to modes 1 and 2 where the invalid packet NULL is not inserted upon transmission, the MPEG2-TS which was read out from the hard disk is transmitted as it is to the network.

When the MPEG2-TS is transmitted as it is to the network in mode 1, however, data having only the prefix bit rate of 1.536 Mbps is transmitted at a bit rate of MPEG2, or four times as fast as the bit rate of MPEG1, so that it cannot be decoded as it is. As a countermeasure, it is sufficient to use a method of providing a buffer memory on the terminal side, storing data of MPEG1 transmitted at the transmission rate of four times, and after that, reproducing the data. As another method of transmission of the MPEG2-TS in mode 1 to the network, which intermittently transmits data using a clock obtained by dividing the transmission clock of 6.144 Mbps into ¼, the bit rate for the inherent data portion of 1.536 Mbps can be substantially assured. The network transmitting method which is peculiar to mode 1 is not necessarily used, but by setting the converting method to mode 2 or 3, the bit rate can also be changed by the insertion of the NULL packet in the invention.

Figure 4:
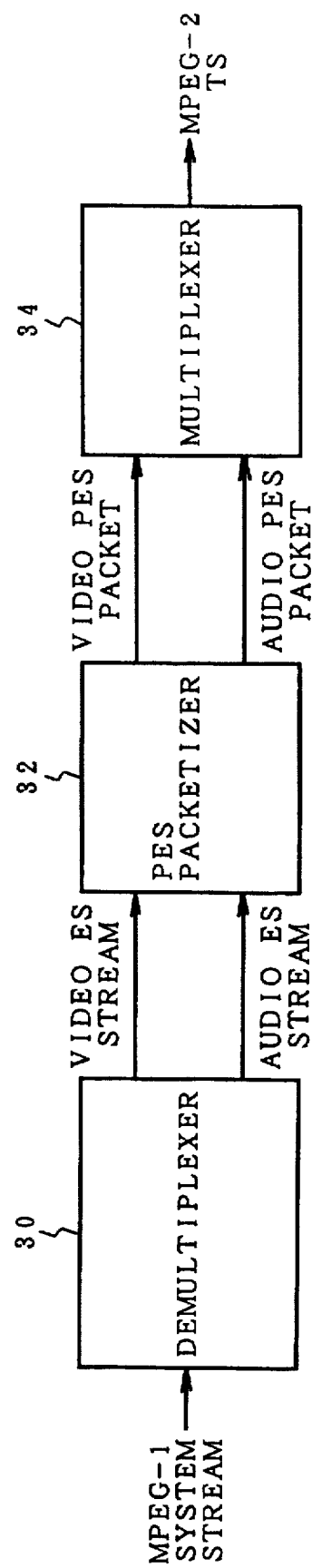
FIG. 4 is a block diagram of a converting apparatus of the invention for executing a conversion of mode 1.

The details of the moving picture stream converting processes in modes 1, 2, and 3 in the flowchart of FIG. 3 will now be described. FIG. 4 is a block diagram of the first embodiment of the invention in which the moving picture stream conversion in mode 1 is executed. A moving picture stream converting apparatus of FIG. 4 comprises a demultiplexer 30, a packetizer 32, and a multiplexer 34. The demultiplexer 30 receives an MPEG1 system stream as a conversion source and outputs elementary streams which were separated into video and audio streams. The packetizer 32 forms packets constructing a packetized elementary stream of MPEG2 with respect to each of the video and audio elementary streams which are supplied from the demultiplexer 30. The packet is usually called a PES packet. The multiplexer 34 divides each of the video and audio PES packets into a TS packet having a fixed length of 188 bytes and subsequently multiplexes, and outputs the resultant data as an MPEG2-TS.

Figure 5:
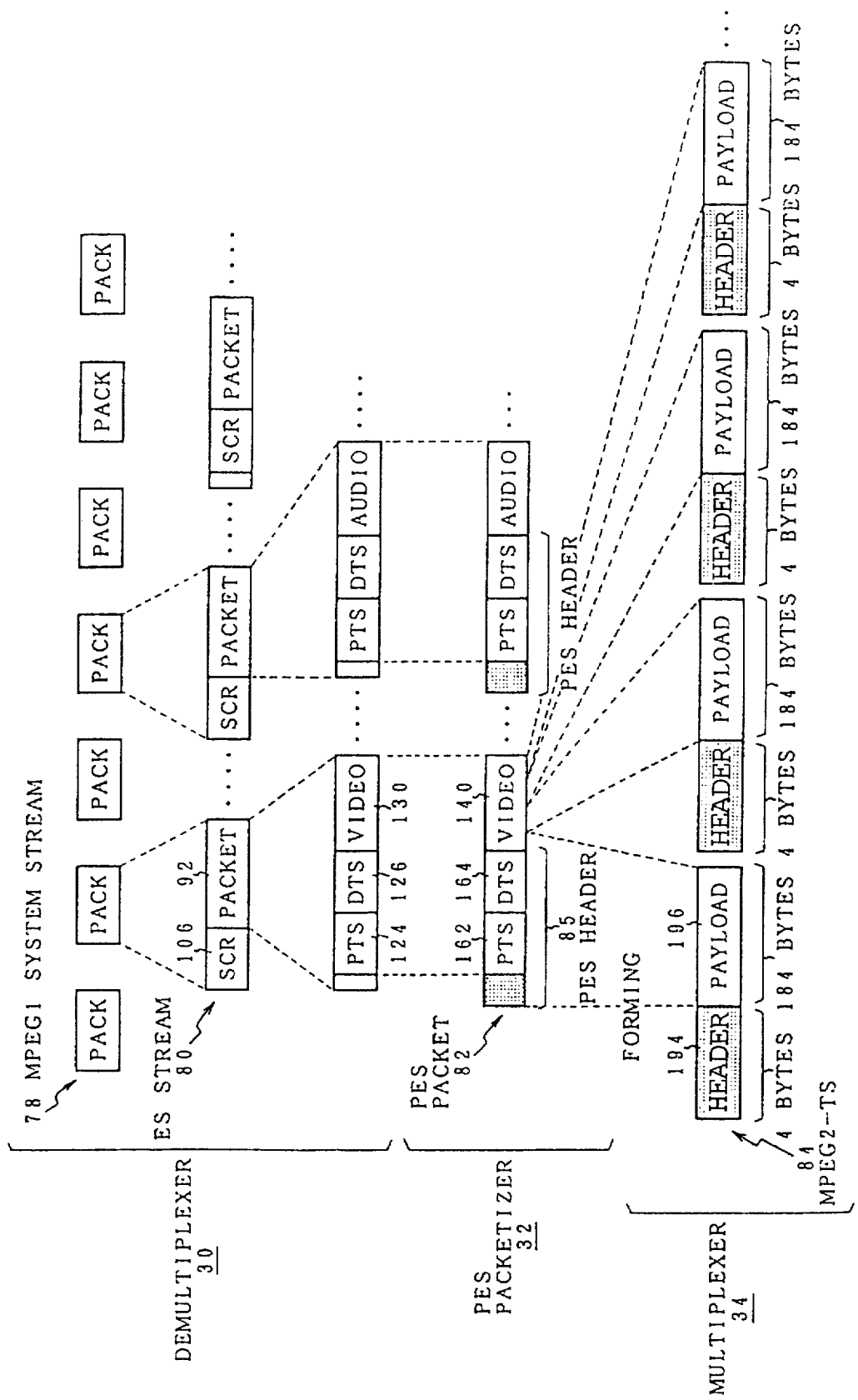
FIG. 5 is an explanatory diagram of the converting process in FIG. 4.
Figure 6:
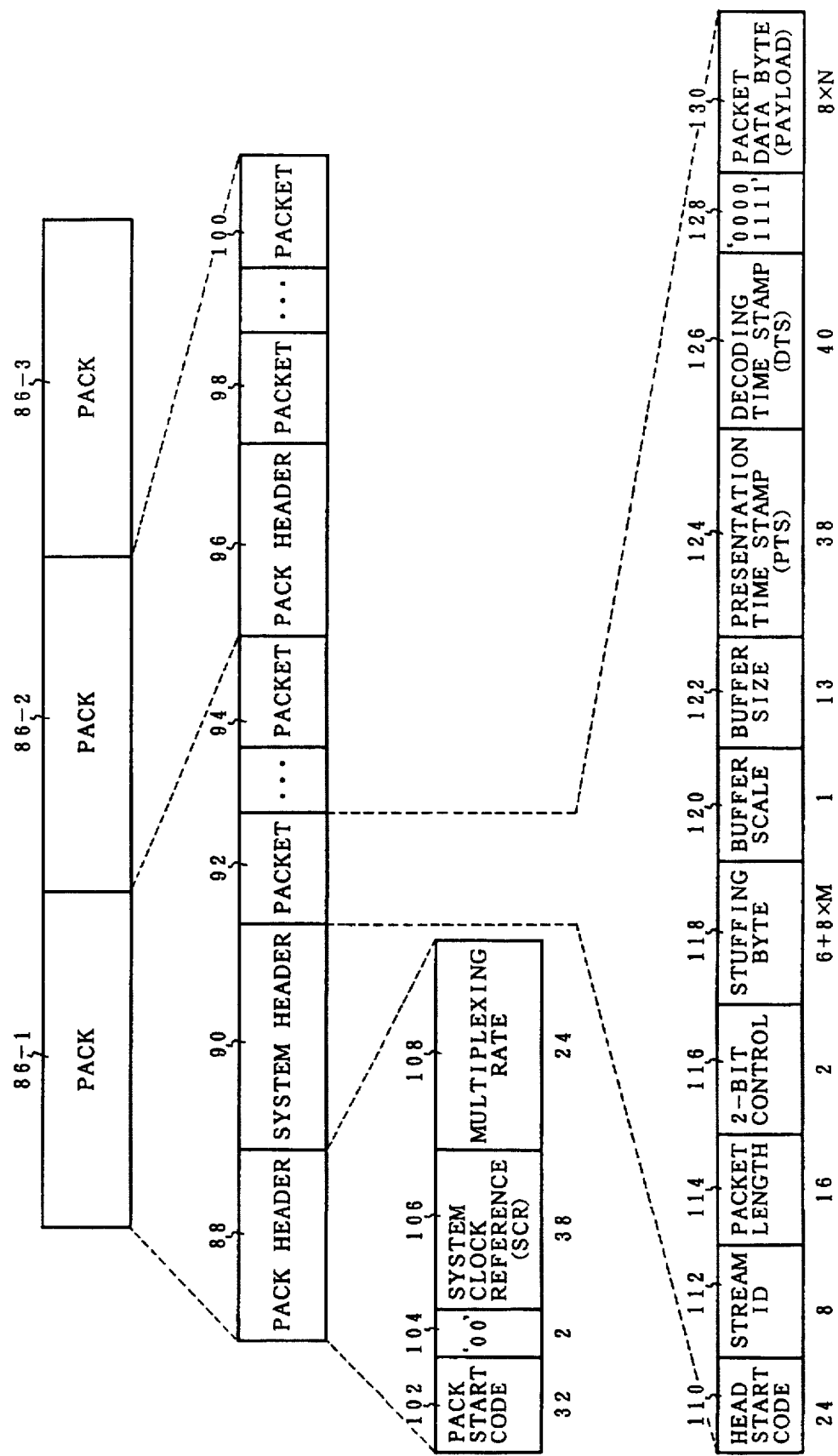
FIG. 6 is an explanatory diagram of an MPEG1 system stream as a conversion source.
Figure 7:
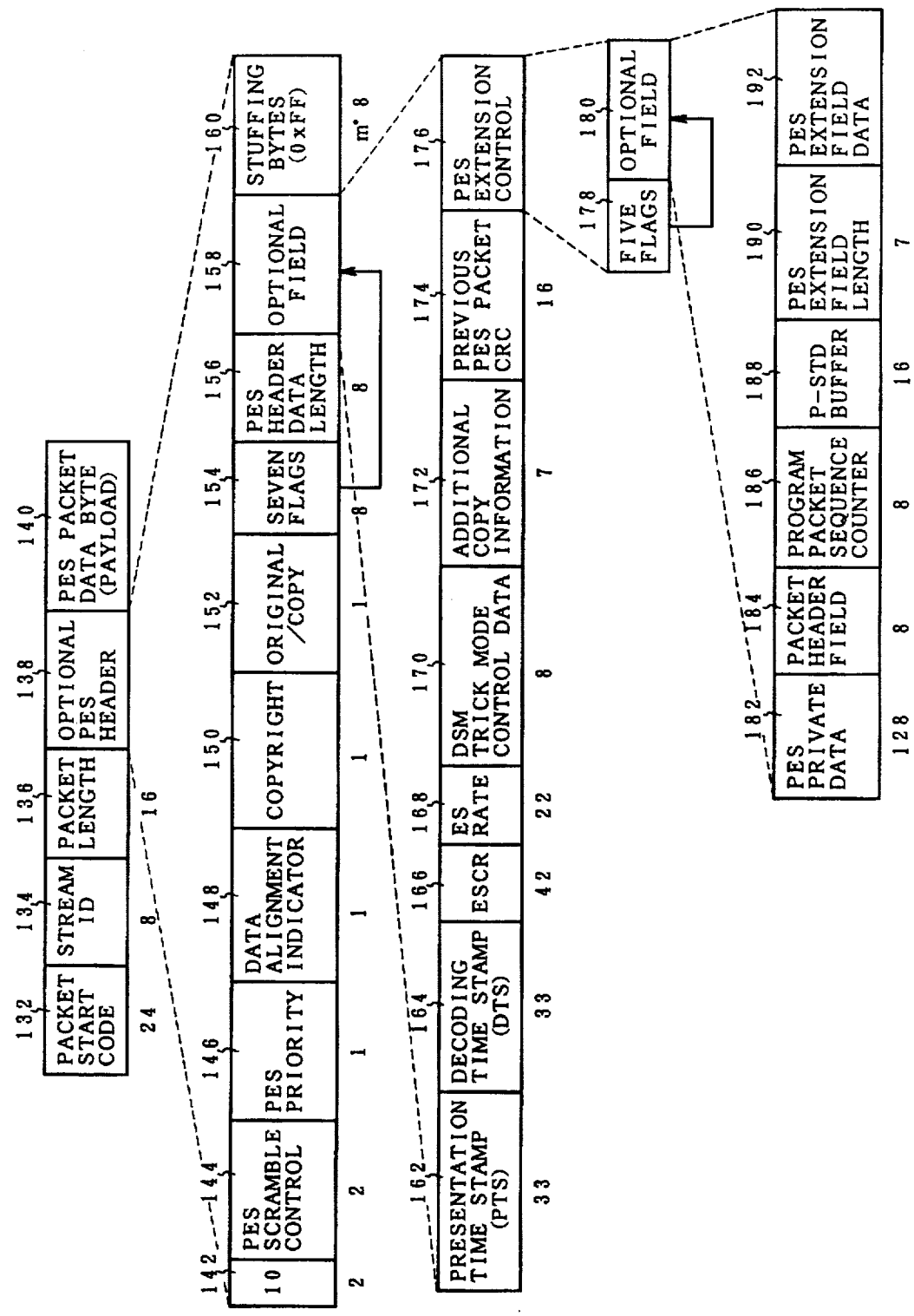
FIG. 7 is an explanatory diagram of a PES packet formed by the process in FIG. 5.

FIG. 5 shows an outline of the converting process of the moving picture stream converting process of FIG. 4. An MPEG system stream 78 which is inputted to the demultiplexer 30 is constructed on a unit basis of data called a pack. Video and audio elementary streams 80 are separated from the packs. The details of the MPEG system stream 78 are as shown in FIG. 7. As shown in FIG. 6, there are three packets 86-1, 86-2, and 86-3. Each of the packs 86-1 to 86-3 have the contents shown with respect to the head pack 86-1. That is, the pack 86-1 has a packet header 88 and a system header 90 and subsequently a plurality of packets 92, ..., 94. In the next second pack 86-2, there is no pack header 88 which was provided in the head pack 86-1, but there are a plurality of packets 98 to 100 subsequent to a system header 96. The third pack 86-3 also has a construction similar to that of the second pack 86-2.

The pack header 88 provided only in the head pack 86-1 is constructed by a pack start code 102, control bits 104 of two bits, a system clock reference (SCR) 106, and a multiplexing rate 108. The system clock reference (SCR) 106 is information for setting a value of reference synchronization information serving as a clock reference to a desired value on the encoder side in an MPEG system decoder including video and audio recorders.

The system header 90 provided subsequent to the pack header 88 has: a head start code 110; a stream ID 112 indicating the kind of video/audio of the packet and the channel number; a packet length 114; a 2-bit control 116; stuffing bytes 118; a buffer scale 120; a buffer size 122; a presentation time stamp 124; a decoding time stamp 126; and packet data bytes 130 constructing a payload provided subsequent to a prefix bit train of one byte. The packet data bytes 130 constructing the payload are set to a variable length region which can assure a region of N times of eight bytes. Parameters except the packet data bytes 130 as a payload construct the packet header.

In the conversion of the moving picture stream according to the invention, the head start code 110, stream ID 112, packet length 114, 2-bit control 116, presentation time stamp 124, and decoding time stamp 126 are decoded from the packet header and used to form parameters of the packet header of a PS packet of MPEG2. The presentation time stamp (PTS) 124 provided for the packet header is time management information of a reproduction output and the decoding time stamp (DTS) 126 is time management information of the decoding. The time stamps 124 and 126 are added to the packet header as shown in the diagram when there is a head of an access unit of video or audio among the packet data bytes 130.

The access unit denotes one unit for decoding and reproduction. In case of video, it indicates one frame. In case of audio, it denotes one audio frame. On the decoding side, consequently, a reproduction output according to the presentation time stamp (PTS) 124 indicative of a reproduction timing and a decoding operation according to the decoding time stamp (DTS) 126 are executed on the basis of the time 92 which is given by the system clock reference (SCR) 106 provided in the pack header 88. When there is no head of the access unit in the packet data bytes 130, the presentation time stamp (PTS) 124 and decoding time stamp (DTS) 126 are not added. Further, the decoding time stamp (DTS) 126 is provided because the decoding order is different from the reproduction output order when the video encoded data is reproduced. Specifically speaking, although the presentation time stamp (PTS) 124 and decoding time stamp (DTS) 126 are added to an I picture and a P picture, only the presentation time stamp (PTS) 124 is added to a B picture or the stream of the I or P picture having no B picture.

Referring again to FIG. 5, in the video and audio elementary streams 80 that are separated from the MPEG1 system stream 78 packs by the demultiplexer 30, only the system clock reference 106 provided for the pack header 88 in the head pack 86-1 in FIG. 6 is shown. As for the subsequent packet 92, only the presentation time stamp 124 and decoding time stamp 126 provided for the packet header are shown. The encoded data of video or the encoded data of audio has been stored in the packet data bytes 130 as a payload. The codes separated by the demultiplexer 30 into the video and audio elementary streams 80 are supplied to the packetizer 32 and are converted to a PES packet 82 of MPEG2.

FIG. 7 shows the details of the PES packet 82 in FIG. 5. First, a PES header is constructed by a packet start code 132, a stream ID 134, a packet length 136, and an optional PES header 138. PES packet data bytes 140 as a payload are provided after the optional PES header 138. The optional PES header 138 is constructed by a 2-bit control 142, a scramble control 144, a priority 146, a data alignment indicator 148, a copyright 150, an original/copy 152, a 7-flag 154, a header data length 156, an optional field 158, and stuffing bytes 160. The optional field 158 is constructed by: a presentation time stamp 162; a decoding time stamp 164; an elementary stream clock reference 166; an elementary stream rate 168; trick mode control data 170; additional copy information 172; a previous PES packet 174; and an extension control 176. The extension control 176 has a 5-flag 178 and an optional field 180. The optional field 180 is constructed by: PES private data 182; a packet header field 184; a program packet sequence counter 186; a system target decoder buffer 188; an extension field length 190; and extension field data 192.

The parameters of the stream ID 134, packet length 136, header data length 156, presentation time stamp 162, and decoding time stamp 164 provided in the header of the PES packet are set on the basis of the MPEG1 system stream as a conversion source in FIG. 6. Prefixed values are used as parameters other than the above parameters. FIGS. 8A, 8B, and 8C show the details of the parameters in the PES header in FIG. 7. Those parameters are separately shown by successive numbers 1 to 41. The contents of the parameters are divided into a syntax, the number of bits, DAVID of the hexadecimal notation, and explanation/remarks. FIGS. 9A and 9B show the correspondence between the names and codes of the parameters in FIGS. 8A, 8B, and 8C with respect to the same numbers 1 to 41.

Referring again to FIG. 5, in the packetizer 32, as shown in the PES packet 82, with respect to, for example, the elementary stream of video separated by the demultiplexer 30, the presentation time stamp 124 is set as a presentation time stamp 162 in the PES header 85 in the PES packet 82. Similarly, the decoding time stamp 126 in the elementary stream 80 is set as a decoding time stamp DTS 164 in the PES header 85 in the PES packet 82. Further, the packet data bytes 130 serving as a payload in the elementary stream 80 is stored as it is into the packet data bytes 140 as a payload of the PES packet 82.

Figure 10:
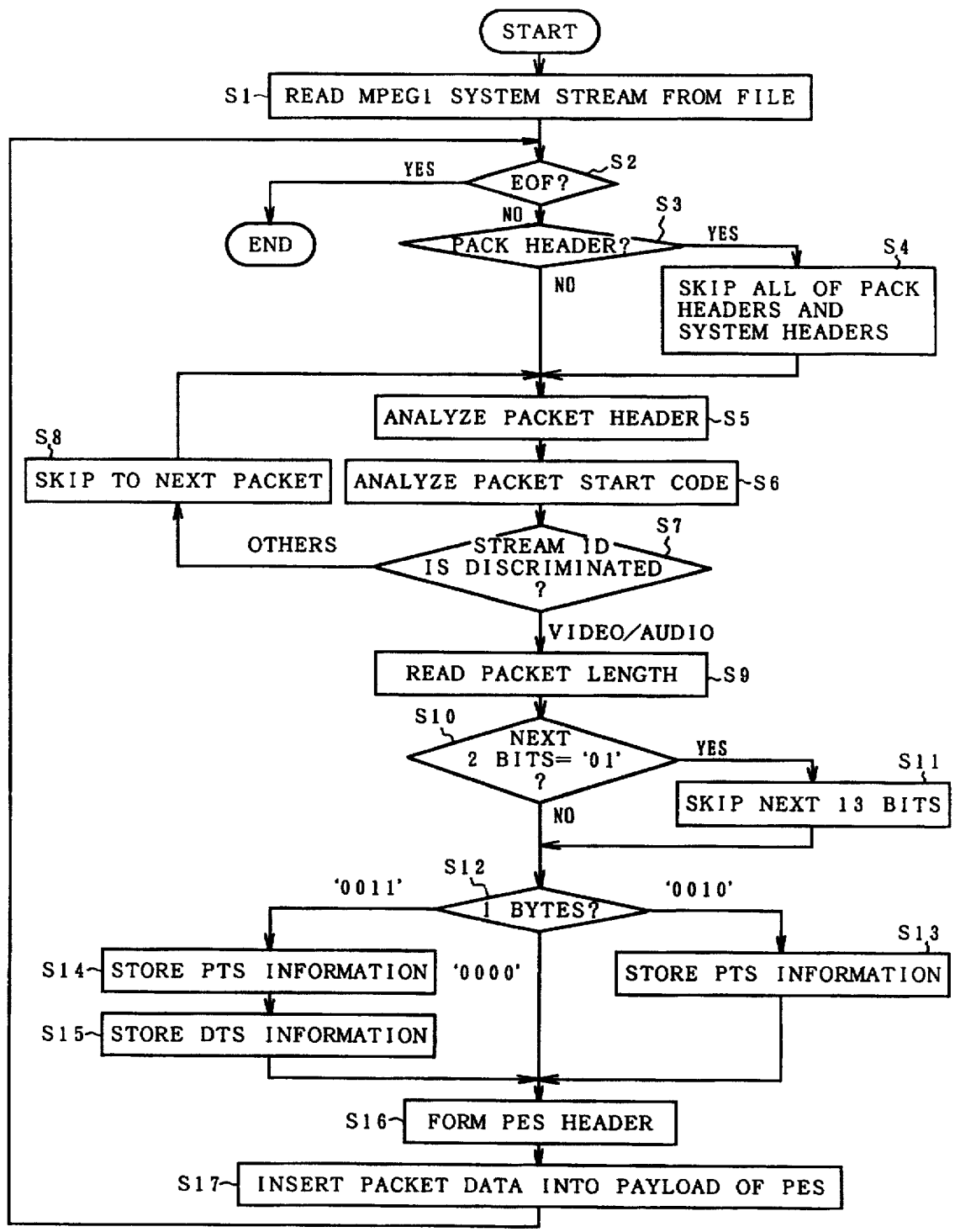
FIG. 10 is a flowchart for a forming process of a PES packet of MPEG2 in FIG. 4.

A flowchart of FIG. 10 shows the details of a process for forming the PES packet 82 by the packetizer 32 in FIG. 5.

First, in step S1, the system stream of MPEG1 of video or audio which was separated, that is, the elementary stream is read out from a file. In step S2, a check is made to see if it is a final frame or not. If NO, step S3 follows and the presence or absence of the pack header is checked. If it is the pack header, step S4 follows and all of the pack headers and subsequent system headers are skipped. The first packet header is analyzed in step S5. The packet header has the contents shown in FIG. 6. The head packet start code 110 is first analyzed in step S6. Subsequently, the stream ID 112 is judged in step S7. The stream ID defines the kind of video/audio and the channel number. For example, it is possible to define 16 channels for video and 32 channels for audio. If neither video nor audio is judged from the stream ID, the reading operation skips to the next packet in step S8 and a similar process is executed.

When video or audio is judged from the stream ID, the packet length 114 is read out in step S9. The next 2-bit control 116 is checked in step S10. When it is equal to "01", 13 bits of the stuffing bytes 118 as dummy bytes are skipped. When the 2-bit control 116 is other than "01", since the stuffing bytes 118 don't exist, step S12 follows. One byte is checked in step S12. In case of "0010", since only the presentation time stamp 124 exists, it is extracted and stored into the presentation time stamp 162 in the PES packet in FIGS. 8A, 8B, and 8C. On the other hand, when the head four bits in one byte are equal to "0011", since both of the presentation time stamp 124 and decoding time stamp 126 in FIG. 7 exist, the presentation time stamp 124 is stored into the presentation time stamp 162 in the PES packet in FIGS. 8A, 8B, and 8C in step S14. The DTS information of the decoding time stamp 126 in FIG. 6 is similarly stored into the decoding time stamp 164 in the PES packet in FIG. 7 in step S15.

Further, when all bits of one byte are equal to zero in step S12, since both of the presentation time stamp and the decoding time stamp don't exist, information is not stored. Thus, the PES header having the contents in FIG. 7 can be formed in step S16. Finally, the encoded data of the packet data bytes 130 of MPEG1 is inserted into the PES packet data bytes 142 as a payload of the PES packet in step S17, thereby enabling one PES packet to be formed. The above processes are repeated until the end of frame code is obtained in step S2.

Referring again to FIG. 5, the multiplexer 34 divides each of the PES packets 82 of video and audio formed by the packetizer 32 on a 184-byte unit basis and stores into a payload 196 in the TS packet in an MPEG2-TS 84. By adding a TS header 194 to each of the payloads 196, the PES packet 82 is converted into the MPEG2-TS 84.

FIG. 11 shows the details of the MPEG2-TS. Each packet of the MPEG2-TS has a prefix length of 188 bytes. The header 194 consists of four bytes and the payload 196 consists of 184 bytes. The header 194 is constructed by sync bytes 198, an error indicator 200, a unit start indicator 202, a transport priority 204, a packet ID 206, a scramble control 208, an adaptation field control 210, a continuity counter 212, and an adaptation field 214. The adaptation field 214 is constructed by an adaptation field length 216, a discontinuity indicator 218, a random access indicator 220, an elementary stream priority indicator 222, a 5-flag 224, an optional field 226, and stuffing bytes 228. Among them, the optional field 226 is constructed by a program clock reference 230, an original program clock reference field 232, a splice count down 234, a private data length 236, private data 238, an adaptation field extension 240, 3-flag 241, and an optional field 242.

Further, the optional field 242 has a legal time window (LTW) valid flag 224, an LTW offset 246, a piecewise (PW) rate indicator 248, a PW rate 250; a seamless splice type 252, and a next access unit demodulation time stamp 254. The details of the parameters of the header 194 of such a TS packet are shown in a range from the sync bytes 198 to the continuity counter 212 in FIG. 12 and the next adaptation field 214 is shown in FIG. 13. The correspondence relation between the names and the codes in FIGS. 12 and 11 is shown in FIG. 14A. Similarly, the correspondence relation between the names and the codes of FIGS. 13 and 11 is shown in FIGS. 14B and 14C.

Figure 15:
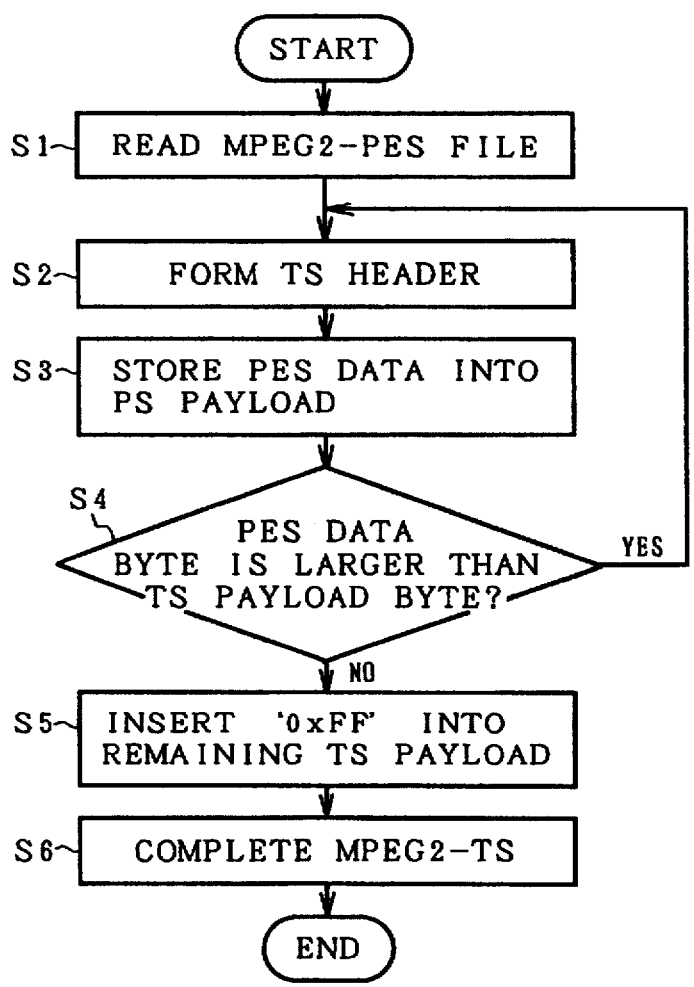
FIG. 15 is an explanatory diagram of a converting process to an MPEG2 system stream.

FIG. 15 shows a process for forming the MPEG2-TS from the PES packet 82 by a multiplexing process in the multiplexer 34 in FIG. 5. First in step S1, the MPEG2-PES file is read. The TS header 194 in FIG. 11 is formed in step S2. The TS header 194 is formed in a manner such that the parameters such as error indicator 200 indicative of the presence or absence of the bit error in the packet, unit start indicator 202 indicating whether a new PES packet appears in the TS payload or not, packet ID 206 indicating whether the packet in the payload is video or audio, adaptation field 214, and adaptation field control 210 indicative of the presence or absence of the payload 196 are set in accordance with the state of the payload storage data of the 184-byte unit divided from the MPEG2-PES packet which had been read in step S1.

With respect to the packet ID 206 in FIG. 11, as shown in FIG. 12, the identification of the video or audio is specified only in the parameter of the head TS packet. Attributes of the stream such as PAT, CAT, reservation, NULL packet (invalid packet), and the like can be set for the subsequent parameters. In correspondence to the setting of the attributes of the invalid packets, the adaptation field control 210 controls and displays the presence of the adaptation field, presence of the payload, ignorance, and further, NULL packet. Referring again to FIG. 15, when the TS header is formed in step S2, the data of 184 bytes which were cut out from the PES data is stored into the TS payload in step S3. In step S4, a check is made to see if the number of PES data bytes is larger than 184 bytes of the TS payload or not. If YES, the processing routine is returned to step S2 and a next TS packet is formed. When the number of bytes of the PES data is smaller than 184 bytes of the TS payload in step S4, step S5 follows. "0xFF" is inserted to the remaining portion of the TS payload and the MPEG2-TS is completed in step s6.

Figure 16:
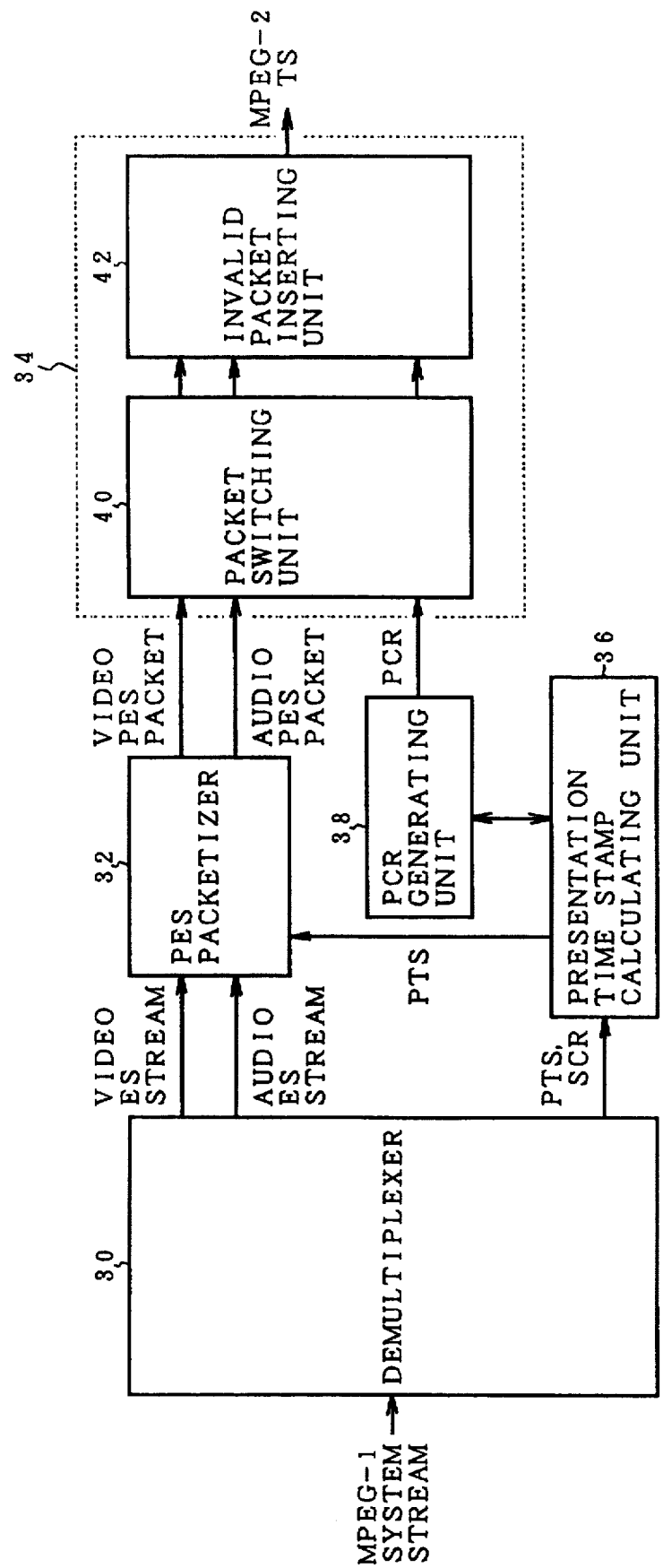
FIG. 16 is a block diagram of an embodiment of Mode 2 for converting a syntax and a transmission rate at the time of a conversion of an MPEG1 transport.
Figure 17:
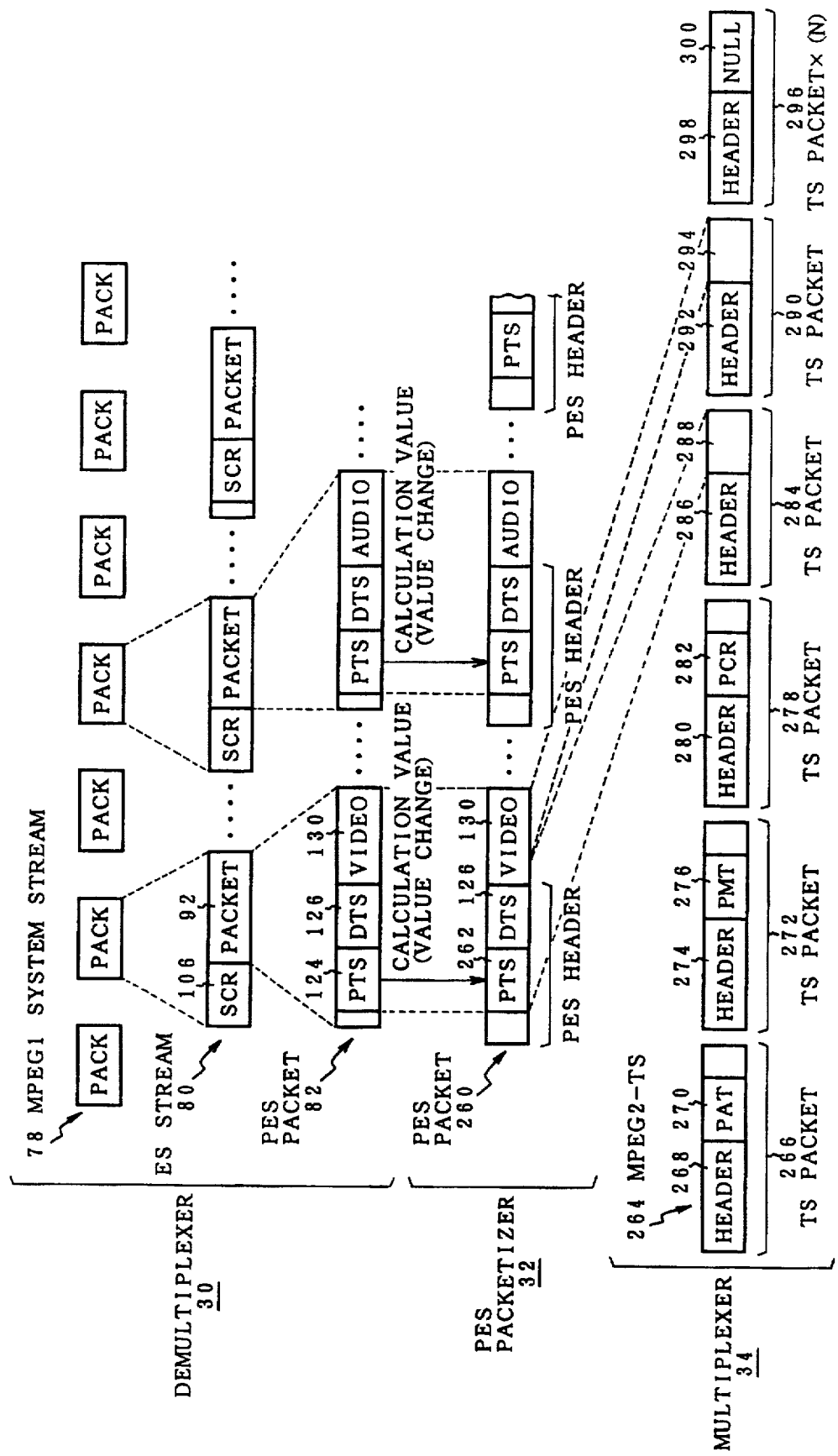
FIG. 17 is an explanatory diagram of a conversion of mode 2 in FIG. 16.

FIG. 16 is a block diagram of an embodiment of the authoring unit in FIG. 1 for executing the converting process in mode 2 in the moving picture stream converting process in FIG. 3. The embodiment in mode 2 is characterized in that when the MPEG1 system stream is converted to the MPEG2-TS, the invalid packet (NULL packet) is inserted in a step of converting the packetized elementary stream of MPEG2, namely, the PES to the TS, thereby adapting the bit rate to 6.144 Mbps of MPEG2. The embodiment of FIG. 16 is constructed by the demultiplexer 30, packetizer 32, and multiplexer 34 and, further, has a presentation time stamp calculating unit 36 and a PCR (program clock reference) generating unit 38. The multiplexer 34 has a packet switching unit 40 and an invalid packet inserting unit 42. The processes of FIG. 16 are as shown in FIG. 17. The demultiplexer 30 outputs the elementary streams 80 of video and audio which were separated with respect to each pack of the MPEG1 system stream 78 given as a conversion source. The packetizer 32 forms the PES packets 82 from the elementary streams 80 of video and audio. The packetizer 32 further outputs the presentation time stamp 124 included in the header of the PES packet 82 to the presentation time stamp calculating unit 36, executes a calculation for changing the output to a value adapted to the transmission rate of MPEG2, and changes the calculation value as a presentation time stamp 262 as shown in a PES packet 260.

While the presentation time stamp of the PES header 85 is changed to the value adapted to the transmission rate of 6.144 Mbps of MPEG2 by the packetizer 32 as mentioned above, the conversion is executed in a manner similar to that in mode 1 shown in FIG. 5. When the PES packets 260 of video and audio are multiplexed, the multiplexer 34 forms TS packets 266, 272, and 278 in which a program association table (PAT) 270, a program map table (PMT) 276, and further, a program clock reference (PCR) 282 which was corrected to the value adapted to the transmission rate of 6.144 Mbps of MPEG2 have been stored, respectively. Subsequent to the TS packet 278, TS packets 284 and 290 in which data 288 and 294 obtained by cutting out the streams of the PES packet 260 on the 180-byte unit basis have been stored, respectively, are generated. The remaining TS packet 296 is set to the invalid packet (NULL packet) and the data of the payload is set to an invalid state 300.

Parameters are decided for headers 268, 274, 280, 286, 292, and 298 in the TS packets 266, 272, 278, 284, 290, and 296 in such an MPEG2-TS 264 in accordance with FIGS. 11, 12, 13, 14A, 14B, and 14C shown with respect to mode 1. The program association table (PAT) 270 and program map table (PMT) 276 inserted in the payloads of the two head TS packets 266 and 272 of the MPEG2-TS are called program specification information (PSI). Since the MPEG2-TS transmits a number of individual streams of video and audio, such program specification information is used to decide which program is selected from a plurality of programs and which packet is extracted and decoded on the decoding side. With respect to the TS packet 296 functioning as an invalid packet inserted to vary the transmission rate, a prefix value "0x1FFF" indicative of the invalid packet (NULL packet) as a parameter of the header 298 is set as a parameter of the packet ID. A code "01" indicative of the invalid packet (NULL packet) as a parameter of the adaptation field control is also stored. When the header 298 in the TS packet 296 is decoded by the decoder, it is consequently recognized as an invalid packet from the packet ID and, further, it can be recognized that the payload portion indicates the invalid data by decoding the adaptation field. Thus, the process of the invalid packet is ignored in the decoder.

According to the converting processes in mode 2 according to the invention FIGS. 16 and 17, both of the syntax and transmission rate correspond to MPEG2 in the state of the converted MPEG2-TS. By forming such an MPEG2-TS in mode 2 using the authoring unit 12 in FIG. 1 and providing it to the stream servers 16-1 and 16-2 installed in the center 16 of the video-on-demand system, the stream servers 16-1 and 16-2 can transmit the streams in response to a request from the user without being aware that the transmitted streams are the converted streams from the MPEG1 system streams.

FIG. 18 shows an embodiment in which mode 2 for converting both the syntax and transmission rate shown in FIG. 16 to those in the MPEG2-TS is further modified and is characterized in that user data can be inserted into the payload in the invalid packet. The embodiment of FIG. 18 relates to a case where, for example, a file of the packetized elementary streams of MPEG2 formed by the packetizer 32 in FIG. 16 are stored into a hard disk 44 and, later converted into the MPEG2-TS. The MPEG2-PES stored in the hard disk 44 is read out by a demultiplexer 48 and is separated to a video PES packet and an audio PES packet. Those packets are supplied to the multiplexer 34. In a manner similar to the embodiment of FIG. 16, the multiplexer 34 is constructed by the packet switching unit 40 and invalid packet inserting unit 42. The invalid packet inserting module 42 can insert invalid packets of user private multimedia data stored in a hard disk 46 which has been separately prepared into a payload. After the MPEG2-TS converted by the multiplexer 34 was stored into the hard disk 56, it is provided to the stream servers 16-1 and 16-2 in the video-on-demand system of FIG. 1.

Figure 19A:
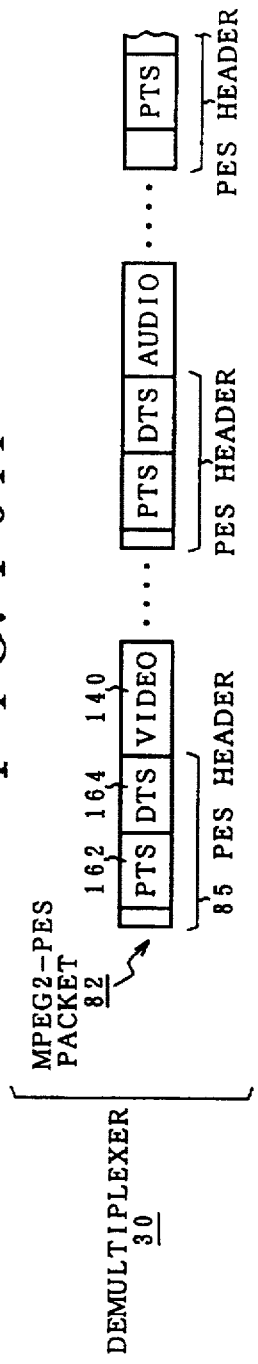
FIGS. 19A and 19B are explanatory diagrams of a converting process from a PES packet to a TS.
Figure 19B:
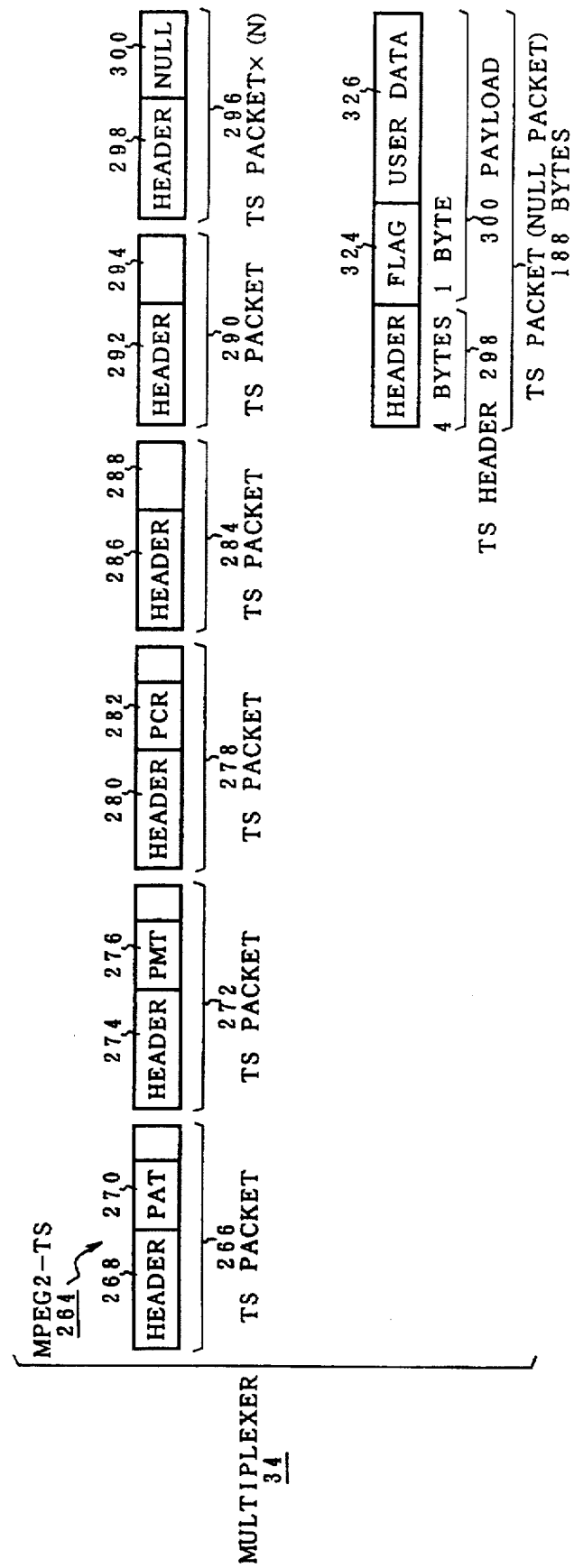

FIGS. 19A and 19B show the converting processes in FIG. 18. The MPEG2-PES packets 82 which were separated to video and audio by the demultiplexer 48 are converted to the MPEG2-TS 264 in FIG. 19B by the multiplexer 34 in a manner similar to the case in mode 2 of FIG. 17. In the MPEG2-TS 264 in FIG. 19B, subsequent to the TS packets 266, 272, and 278 in which the program association table (PAT) 270, program map table (PMT) 276, and program clock reference (PCR) 282 have been stored in the payloads, the TS packets 284 and 290 in which the data 288 and 294 cut out from the streams of the MPEG2-PES packet on a 184-byte unit basis have been stored are provided and, after that, an arbitrary number of TS packets 296 are provided as invalid packets. With respect to four bytes of the TS header 298 in the TS packets 296 serving as invalid packets, particularly, the following parameters among the parameters shown in FIG. 12 are set.

I. The unit start indicator (payload unit start indicator) is set to "0" indicating that a new PES packet doesn't appear in the TS payload.

II. The packet ID is set to "0x1fff" indicative of the invalid packet.

III. The adaptation field control is set to "01" indicative of the invalid packet.

Subsequent to the setting of the parameters for the invalid packets of the TS header 298, the head one byte of the payload 300 of 184 bytes is set to a user flag 324. For example, "0x01" is used as a user flag 324. Subsequently, user data 326 is inserted. In such an invalid TS packet 296 having the TS header 298 and payload 300, after the above-mentioned parameters I to III of the TS header 298 were confirmed by the decoder, the user flag 324 of the head one byte in the payload 300 is confirmed. When the user flag "0x01" is confirmed, it is known that the remaining 183 bytes are the user data 326, so that the user data 326 as user data which is not based on MPEG2 can be subjected to a proper process. Since the TS packet 296 is the invalid packet from a view point of the MPEG2 standard, all of the user flag 324 and user data 326 in the payload are ignored and no influence is exerted on the decoding of video and audio.

FIG. 20 shows an embodiment in which the invalid packets are inserted just before the transmission to the network of the MPEG2-TS and the transmission rate is changed to 6.144 Mbps of MPEG2 in mode 2 shown in the video-on-demand process in FIG. 3. The invalid packets are inserted when the moving picture streams are transmitted from the stream servers 16-1 and 16-2 installed in the center 16 of the video-on-demand system of FIG. 1. It is consequently realized as one function of the data transmission control module 72, disk access control module 74, and line control module 76 in the stream server 16 in FIG. 2. In FIG. 20, the MPEG2-TS converted in accordance with mode 1 shown in FIG. 4 has been stored in the hard disk 56. A specific MPEG2-TS is read out from the hard disk 56 by a request from the user and is sent to the set top unit 26 of the user via the network 22, is decoded, and is reproduced by the television apparatus 28. An ATM network is used as a network 22. The invalid packets are inserted into the MPEG2-TS read out from the hard disk 56 by an invalid packet inserting module 57 so as to be adapted to the prefix bit rate of 6.144 Mbps of MPEG2. That is, as shown in FIG. 21, in the MPEG2-TS read out from the hard disk 56, although the syntax has been converted to that of MPEG2, the bit rate is held to 1.536 Mbps of MPEG1. A program clock reference (PCR) 304 provided in the header of a head TS packet 302 is corrected to a value adapted to the transmission rate of 6.144 Mbps of MPEG2. A corrected program clock reference (PCR) 306 is set with respect to the head TS packet 302 of an MPEG2-TS 301 to be transmitted.

Subsequently, TS packets 308 and 310 in the original MPEG2-TS 300 are transmitted as they are and an arbitrary number of invalid TS packets 320-1 to 320-N functioning as invalid packets of the number necessary to adapt the transmission rate to 6.144 Mbps are inserted into an interval until a TS packet 312 including the head of the next TS packet. The streams in which both of the syntax and the transmission rate were converted to those of the MPEG2-TS are consequently supplied to an ATM cell forming processing unit 58. The stream of the TS packet is converted to cells of a 58-byte unit by the ATM cell forming processing unit 58 and the cells are transmitted to the network 22. In mode 3 in which the invalid packets are inserted upon transmission to the network in FIGS. 20 and 21, since the invalid packets necessary to adapt the transmission rate are not inserted at the stage of the MPEG2-TS stored in the hard disk 56, as a capacity necessary for the hard disk 56, it is sufficient to use a capacity corresponding to the MPEG1 system stream, so that even if data was converted to the MPEG2-TS, the disk memory capacity can be reduced.

According to the invention as mentioned above, without using the expensive encoder of MPEG2, the conversion can be easily executed in a manner such that after the moving picture stream data of video and audio was converted to the MPEG1 system streams by the cheap MPEG1 encoder, fundamentally, only the syntax is converted to the MPEG2-TS by the moving picture stream conversion of the invention. Further, as for the transmission to the network, by changing the transmission rate, both the syntax and the transmission rate can be converted to the format as an MPEG2-TS. In the video-on-demand system corresponding to the MPEG2-TS as well, accordingly, by merely installing the cheap MPEG1 encoder and the moving picture stream converting apparatus of the invention, the MPEG2 system format having excellent application functions can be easily realized.

In the case where the recording medium such as a CD-ROM or the like on which the MPEG1 system stream has been recorded is transmitted to the video-on-demand system corresponding to MPEG2 using the MPEG2 encoder after the original video and audio data has been decoded from the MPEG1 system stream on the recording medium, they are again converted by the MPEG2 encoder. On the contrary, since the moving picture stream apparatus of the invention can directly convert the MPEG1 system stream read out from the recording medium to the MPEG2-TS, a deterioration of the image by the re-conversion after the decoding is suppressed and video resources of the MPEG1 system stream can be effectively utilized.

Although the conversion from the MPEG1 system stream to the MPEG2-TS, which is used for the video-on-demand system, has been described as an example in the foregoing embodiment, the invention is not limited to such an example, but can be also applied to a system using a proper moving picture stream. The invention is also not limited by the numerical values shown in the description of the embodiment.

What is claimed is:

1. A moving picture stream converting apparatus to convert an MPEG1 system stream, that includes a stream of encoded video data and a stream of encoded audio data, to a transport stream of MPEG2, the apparatus comprising:

a demultiplexer for receiving the MPEG1 system stream and for separating the streams of encoded video and audio data to form a separate elementary video stream and a separate elementary audio stream, the MPEG1 system stream having a plurality of packs, one of the plurality of packs having a packet header, and each of the plurality of packs having a corresponding system header and a corresponding plurality of packets, each of the plurality of packets having an elementary stream payload to store video or audio encoded data, and an elementary stream header having a packet start code, a stream ID, a packet length corresponding to the elementary stream payload, and time management information;

a packetizer for forming a corresponding MPEG2 elementary stream packet for each of the separate video and audio elementary streams separated by said demultiplexer, each MPEG2 elementary stream packet having a packetized elementary stream payload to store video or audio encoded data, and a packetized elementary stream header having a packet start code, a stream ID, a packet length corresponding to the packetized elementary stream payload, and time management information; and a multiplexer for dividing said packetized elementary streams and storing the divided packetized elementary streams into transport packets having a corresponding prefixed length, and for multiplexing the transport packets and converting the packetized elementary streams to the transport stream of MPEG2, wherein the packetizer receives the separated MPEG1 system streams, analyzes the elementary stream header, and extracts and stores the stream ID, packet length, and time management information in the MPEG2 packetized stream header, and data of said elementary stream payload is stored in the MPEG2 packetized elementary stream payload.

2. An apparatus according to claim 1, further comprising a video-on-demand system, having a video server, formed by said demultiplexer, said packetizer, and said multiplexer, wherein the MPEG2 transport stream converted from the MPEG1 system stream is provided to the video server.

3. An apparatus according to claim 1, wherein said MPEG2 transport stream has a transport stream header of a predetermined byte length and a transport stream payload, said transport stream header having sync bytes, an error indicator for indicating a bit error in a packet, a payload unit start indicator for indicating a start of a new packetized elementary stream packet in the transport stream payload, a stream ID for identifying audio and video data and a channel number, control information for indicating the presence of an adaptation field and the payload, and wherein said multiplexer cuts out and stores each of the video and audio packetized elementary stream packets formed by said packetizer on a predetermined byte length unit basis into the transport stream payload, forms said transport stream header corresponding to the stored data, and adds to a location before each of the transport stream payloads, to convert the separate streams of encoded video and audio data to the MPEG2 transport stream.

4. An apparatus according to claim 3, wherein said multiplexer has an invalid packet inserting module for inserting a transport stream packet in which invalid data has been stored in the transport stream payload to be adapted to a transmission rate of MPEG2 when the packetized elementary stream formed by said packetizer is converted to the MPEG2 transport stream.

5. An apparatus according to claim 4, wherein said multiplexer inserts a transport stream packet in which the invalid data has been stored in the payload to obtain a transmission rate of 6.144 Mbps of MPEG2 for a transmission rate of 1.536 Mbps of MPEG1.

6. An apparatus according to claim 4, wherein the transport stream packet has a head, in which program specification information and a system clock reference have been stored and wherein the multiplexer arranges the transport stream packet and multiplexingly arranges video and audio transport stream packets.

7. An apparatus according to claim 6, wherein said program specification information has a transport stream packet, having a transport stream payload, in which a program association table has been stored, and a transport stream packet in which a program map table has been stored.

8. An apparatus according to claim 4, wherein said invalid packet inserting module stores user data and information indicating that meaningful data has been stored in the transport stream packet in which invalid data has been stored.

9. An apparatus according to claim 8, wherein the invalid transport stream packet has a payload with a head position having a head byte, and said invalid packet inserting module sets data indicating to the unit start indicator that the payload is not in the head position, sets an invalid packet ID, sets "there is a payload" to the adaptation field control, and sets a predetermined user flag to the head byte of the payload, and wherein, when the user flag is recognized, a process corresponding to the meaningful data stored in the transport stream packet is in enabled.

10. An apparatus according to claim 1, further comprising an invalid packet inserting unit for inserting a transport stream packet in which invalid data has been stored in the transport stream payload to be adapted to the transmission rate of MPEG2.

11. An apparatus according to claim 10, wherein said invalid packet inserting unit inserts the transport stream packet in which invalid data has been stored so that the transmission rate is set to a transmission rate of 6.144 Mbps of MPEG2 for a transmission rate of 1.536 Mbps of MPEG1.

12. An apparatus according to claim 10, wherein the transport stream packet in which invalid data has been stored has a program clock reference that is set by said invalid packet inserting unit.

13. An apparatus according to claim 10, further comprising an ATM cell forming processing unit for converting the MPEG2 transport stream to a cell of an ATM network and transmitting the cells to the ATM network after insertion of a transport stream packet by said invalid packet inserting unit.

* * * * *